United States Patent
Nakamura et al.

(10) Patent No.: US 11,498,317 B2
(45) Date of Patent: Nov. 15, 2022

(54) MULTILAYERED CONTAINER AND METHOD FOR PRODUCING SAME

(71) Applicant: Mitsubishi Gas Chemical Company, Inc., Tokyo (JP)

(72) Inventors: Jin Nakamura, Kanagawa (JP); Takanori Miyabe, Kanagawa (JP); Takafumi Oda, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 17/269,243

(22) PCT Filed: Aug. 8, 2019

(86) PCT No.: PCT/JP2019/031409
§ 371 (c)(1),
(2) Date: Feb. 17, 2021

(87) PCT Pub. No.: WO2020/039967
PCT Pub. Date: Feb. 27, 2020

(65) Prior Publication Data
US 2021/0323289 A1    Oct. 21, 2021

(30) Foreign Application Priority Data

Aug. 24, 2018   (JP) .............................. JP2018-157226

(51) Int. Cl.
*B32B 27/08*     (2006.01)
*B32B 27/36*     (2006.01)
(Continued)

(52) U.S. Cl.
CPC .............. *B32B 27/08* (2013.01); *B29C 71/04* (2013.01); *B32B 1/02* (2013.01); *B32B 27/16* (2013.01);
(Continued)

(58) Field of Classification Search
CPC ....... B65B 55/08; B32B 1/02; B32B 2250/03; B32B 2250/24; B32B 2439/60;
(Continued)

(56) References Cited

U.S. PATENT DOCUMENTS 8,124,204 B2 * 2/2012 Mitadera ................... B32B 7/02
428/36.7
2009/0061057 A1   3/2009 Beckwith et al.
(Continued)

FOREIGN PATENT DOCUMENTS

CN    101365573 A    2/2009
CN    101835606 A    9/2010
(Continued)

OTHER PUBLICATIONS

International Search Report for PCT/JP2019/031409, dated Sep. 10, 2019, and English Translation submitted herewith (5 pages).
(Continued)

*Primary Examiner* — Yan Lan
(74) *Attorney, Agent, or Firm* — Fitch, Even, Tabin & Flannery LLP

(57) ABSTRACT

Provided is a multilayered container including a polyester layer containing a thermoplastic polyester resin (X) and a polyamide layer containing a polyamide resin (Y), wherein the polyester layer is an innermost layer, and the polyamide layer is an intermediate layer. The polyamide resin (Y) has a constituent unit derived from a diamine and a constituent unit derived from a dicarboxylic acid. At least 70 mol % of the constituent units derived from a diamine are a constituent unit derived from a xylylenediamine, and at least 70 mol % of the constituent units derived from a dicarboxylic acid are a constituent unit derived from an α,ω-linear aliphatic dicarboxylic acid having from 4 to 20 carbons. When an overall thickness is 100%, the polyamide layer is present (Continued)

from a position of 5 to 35% from an inner surface, and a thickness of the polyamide layer is from 1 to 15%.

13 Claims, 1 Drawing Sheet

(51) Int. Cl.
*B32B 27/34* (2006.01)
*B32B 27/16* (2006.01)
*B32B 1/02* (2006.01)
*B65B 55/08* (2006.01)
*B65D 1/02* (2006.01)
*B29C 71/04* (2006.01)
*B29C 49/22* (2006.01)
*B29K 67/00* (2006.01)
*B29K 77/00* (2006.01)
*B29L 31/00* (2006.01)

(52) U.S. Cl.
CPC .............. *B32B 27/34* (2013.01); *B32B 27/36* (2013.01); *B65B 55/08* (2013.01); *B65D 1/0207* (2013.01); *B29C 49/22* (2013.01); B29K 2067/003 (2013.01); B29K 2077/00 (2013.01); B29L 2031/7158 (2013.01); *B32B 2250/03* (2013.01); *B32B 2250/24* (2013.01); *B32B 2250/40* (2013.01); *B32B 2439/60* (2013.01)

(58) Field of Classification Search
CPC ......... B32B 27/08; B32B 27/34; B32B 27/36; B32B 2250/40; B32B 2270/00; B32B 2272/00; B32B 2307/306; B32B 2307/4026; B32B 2307/412; B32B 2307/704; B32B 2307/7244; B32B 2307/732; B32B 2439/70; B32B 2439/80; B32B 27/16; B32B 27/18; B32B 7/12; B29C 49/22; B29C 71/04; B65D 1/0207; B65D 1/00; B65D 1/02; B65D 1/0215; B29K 2067/003; B29K 2077/00; B29L 2031/7158

See application file for complete search history.

(56) References Cited

U.S. PATENT DOCUMENTS

| | | |
|---|---|---|
| 2010/0180979 A1 | 7/2010 | Mitadera et al. |
| 2016/0193813 A1 | 7/2016 | Sato et al. |

FOREIGN PATENT DOCUMENTS

| | | | |
|---|---|---|---|
| CN | 105451992 A | | 3/2016 |
| EP | 1857270 A1 | | 11/2007 |
| EP | 1902838 A1 | | 3/2008 |
| EP | 2130783 A1 | | 12/2009 |
| EP | 2965906 A1 | | 1/2016 |
| JP | S60-232952 A | | 11/1985 |
| JP | S61-259944 A | | 11/1986 |
| JP | 2003-033964 A | | 2/2003 |
| JP | 2003-33964 | * | 3/2003 |
| JP | 2005-088901 A | | 4/2005 |
| JP | 2006-111718 A | | 4/2006 |
| JP | 2011-020373 A | | 2/2011 |
| JP | 2012-111506 A | | 6/2012 |
| JP | 2015-101403 A | | 6/2015 |
| JP | 2016-169027 A | | 9/2016 |
| JP | 2016-198911 A | | 12/2016 |
| JP | 2016-198912 A | | 12/2016 |
| JP | 2017-122723 A | | 7/2017 |
| WO | 2008/126745 A1 | | 10/2008 |
| WO | 2011/132622 A1 | | 10/2011 |

OTHER PUBLICATIONS

Xu et al. "Preparation and Barrier Behavior of Multi-layer Biodegradable PBAT/PPC Films," China Plastics, 2016, vol. 30, No. 3 (5 pages).

* cited by examiner

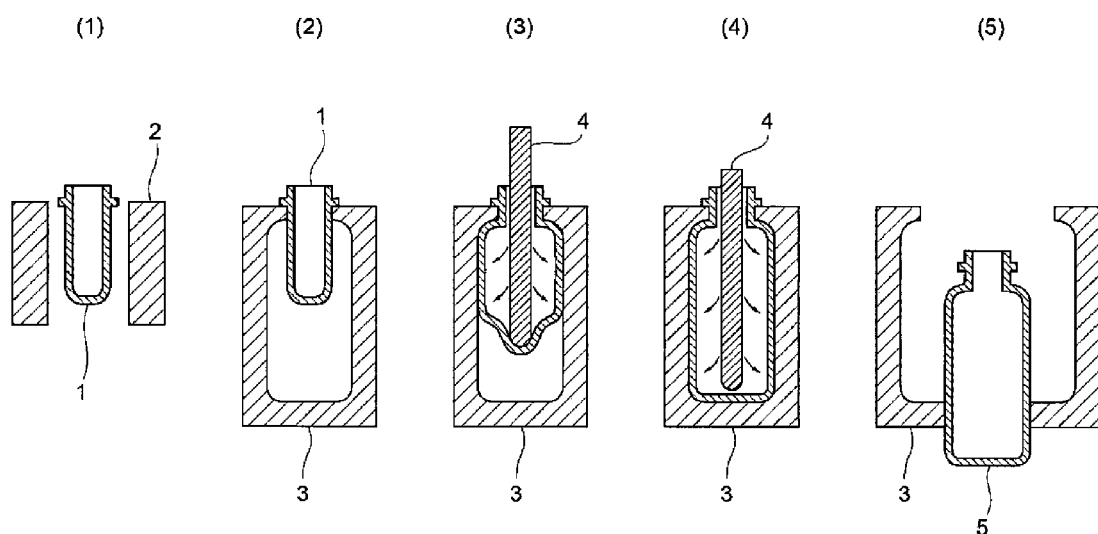

MULTILAYERED CONTAINER AND METHOD FOR PRODUCING SAME

CROSS-REFERENCE TO RELATED APPLICATIONS

This application is a U.S. national phase application filed under 35 U.S.C. § 371 of International Application Number PCT/JP2019/031409, filed Aug. 8, 2019, designating the United States, which claims priority from Japanese Application Number 2018-157226, filed Aug. 24, 2018.

Field of the Invention

The present invention relates to a multilayered container and a method for producing the same.

Background of the Invention

Polyester resins, typified by polyethylene terephthalate (PET), excel in characteristics such as transparency, mechanical properties, melt stability, and recyclability, and therefore are currently widely used in various packaging materials such as films, sheets, and hollow containers. However, in bottle applications, the gas barrier properties of polyester resins against gases such as carbon dioxide and oxygen are not always sufficient in hollow containers made of polyester resin alone.

Therefore, multilayered bodies and multilayered containers that use a polyester resin as a resin constituting an outer layer and an inner layer, and have, as an intermediate layer, a barrier layer formed from a polyamide resin between the outer layer and the inner layer have been examined in the past (Patent Documents 1 to 3).

CITATION LIST

Patent Documents

Patent Document 1: JP 2016-169027 A
Patent Document 2: JP 60-232952 A
Patent Document 3: JP 2006-111718 A

SUMMARY OF INVENTION

The present inventors found that when a polyamide resin constituted of meta-xylylenediamine and adipic acid is used as the polyamide resin, a multilayered container with excellent oxygen barrier properties can be obtained, but the outer layer or inner layer formed from a polyester resin, and the barrier layer (intermediate layer) may delaminate in some cases due to impact from the outside or the like.

Thus, an object of the present invention is to solve the problem described above by providing a multilayered container excelling in delamination resistance and having improved oxygen barrier properties, and to provide a method for producing the multilayered container.

As a result of diligent research in light of the problem described above, the present inventors discovered that for a multilayered container including a polyamide layer containing a specific polyamide resin, and a polyester layer, the above-mentioned problem is solved by setting the presence location of the polyamide layer and the thickness of the polyamide layer to within specific ranges, and with this discovery, the present inventors arrived at the present invention. The present invention provides the following aspects [1] to [11].

[1] A multilayered container including: a polyester layer containing a thermoplastic polyester resin (X), and a polyamide layer containing a polyamide resin (Y), the polyester layer being an innermost layer, and the polyamide layer being an intermediate layer; wherein the polyamide resin (Y) includes a polyamide resin (Y-1) including a constituent unit derived from a diamine and a constituent unit derived from a dicarboxylic acid, at least 70 mol % of the constituent units derived from a diamine being a constituent unit derived from a xylylenediamine, and at least 70 mol % of the constituent units derived from a dicarboxylic acid being a constituent unit derived from an $\alpha,\omega$-linear aliphatic dicarboxylic acid having from 4 to 20 carbons; and when an overall thickness is 100%, the polyamide layer is present from a position of 5 to 35% from an inner surface, and a thickness of the polyamide layer is from 1 to 15%.

[2] The multilayered container according to [1], wherein the overall thickness of the multilayered container is from 50 to 500 μm.

[3] The multilayered container according to [1] or [2], wherein the multilayered container includes at least one polyester layer at each of an inner side and an outer side of the polyamide layer.

[4] The multilayered container according to [1] or [2], wherein the multilayered container is a trilayer structure including polyester layers as the innermost layer and an outermost layer, and the polyamide layer as the intermediate layer.

[5] The multilayered container according to any one of [1] to [4], wherein the thermoplastic polyester resin (X) contains a thermoplastic polyester resin (X-1) including a constituent unit derived from a dicarboxylic acid and a constituent unit derived from a diol, at least 50 mol % of the constituent units derived from a dicarboxylic acid being a constituent unit derived from terephthalic acid, and at least 50 mol % of the constituent units derived from a diol being a constituent unit derived from ethylene glycol.

[6] The multilayered container according to [5], wherein the thermoplastic polyester resin (X-1) includes a constituent unit derived from a dicarboxylic acid and a constituent unit derived from a diol, at least 90 mol % of the constituent units derived from a dicarboxylic acid being a constituent unit derived from terephthalic acid, and at least 90 mol % of the constituent units derived from a diol being a constituent unit derived from ethylene glycol.

[7] The multilayered container according to any one of [1] to [6], wherein the polyamide resin (Y-1) includes a constituent unit derived from a diamine and a constituent unit derived from a dicarboxylic acid, at least 80 mol % of the constituent units derived from a diamine being a constituent unit derived from a xylylenediamine, and at least 80 mol % of the constituent units derived from a dicarboxylic acid being a constituent unit derived from adipic acid.

[8] The multilayered container according to any one of [1] to [7], wherein the polyamide layer does not substantially contain a transition metal.

[9] The multilayered container according to any one of [1] to [8], wherein the multilayered container is irradiated with an electron beam from inside the container.

[10] The multilayered container according to any one of [1] to [9], wherein a radical concentration of the polyamide layer is greater than or equal to $1.0 \times 10^{1}$ mol/g.

[11] A method for producing the multilayered container described in any one of [1] to [10], the method including the following steps 1 and 2 in this order.

Step 1: producing a multilayered container molded body including a polyester layer as an innermost layer, and a polyamide layer as an intermediate layer.

Step 2: irradiating the multilayered container molded body with an electron beam from the inside.

According to the present invention, a multilayered container excelling in delamination resistance and having improved oxygen barrier properties, and a method for producing the same can be provided.

BRIEF DESCRIPTION OF DRAWINGS

FIG. 1 is a conceptual schematic view illustrating steps of cold parison molding.

DESCRIPTION OF EMBODIMENTS

The present invention will be described below using embodiments. Note that in the following description, descriptions of "from A to B" indicating a numerical range indicate "greater than or equal to A and less than or equal to B" (when A<B), or "less than or equal to A and greater than or equal to B" (when A>B). In other words, descriptions of "from A to B" indicate numerical ranges including the endpoints A and B.

Furthermore, the terms parts by mass and mass % are synonymous with the terms parts by weight and wt. %, respectively.

Multilayered Container

A multilayered container of the present invention is characterized in that it includes a polyester layer containing a thermoplastic polyester resin (X), and a polyamide layer containing a polyamide resin (Y), the polyester layer being an innermost layer, and the polyamide layer being an intermediate layer; wherein the polyamide resin (Y) includes a polyamide resin (Y-1) including a constituent unit derived from a diamine and a constituent unit derived from a dicarboxylic acid, at least 70 mol % of the constituent units derived from a diamine being a constituent unit derived from a xylylenediamine, and at least 70 mol % of the constituent units derived from a dicarboxylic acid being a constituent unit derived from an $\alpha,\omega$-linear aliphatic dicarboxylic acid having from 4 to 20 carbons; and when an overall thickness is 100%, the polyamide layer is present from a position of 5 to 35% from an inner surface, and a thickness of the polyamide layer is from 1 to 15%.

The present inventors discovered that for a multilayered container including a polyester layer containing the thermoplastic polyester resin (X), and a polyamide layer containing, as the polyamide resin (Y), a specific polyamide resin (Y-1), the polyester layer being the innermost layer, and the polyamide layer being an intermediate layer, a multilayered container excelling in oxygen barrier properties and delamination resistance can be obtained by disposing the polyamide layer such that the polyamide layer is present from a position of 5 to 35% from an inner surface when the overall thickness is 100%, and such that the thickness of the polyamide layer is from 1 to 15% of the overall thickness, and thereby, the inventors arrived at the present invention. The mechanism for obtaining the effects described above is presumed to be as follows.

Arranging, near a center portion in the overall thickness, a polyamide layer containing a specific polyamide resin (Y-1) having gas barrier properties has been implemented in the past. However, it is presumed that by arranging the polyamide layer at a position close to the inner surface of the multilayered container as in the present invention, a barrier layer is present near the contents in the container, and while the reason is not clear, the oxygen barrier properties are surprisingly further improved. It is also thought that by positioning the barrier layer at the inner side, the stretching distance in the thickness direction increases during blow molding as compared to a case where the barrier layer is positioned at the outer side, and thus the stretching ratio of the barrier layer increases, molecules are further oriented and the gaps between the molecules are filled, and thereby a higher oxygen barrier property is obtained. Also, delamination is caused by physical impact from the outside, but the effect of increasing the distance from the polyamide layer to the outer surface is greater than expected, and since the interface between the polyester layer and the polyamide layer is present at a position close to the inner surface, impact from the outside is absorbed, and impact is less likely to be transferred to the interface. It is presumed that delamination resistance is improved as a result.

It is also clear that the above oxygen barrier properties and delamination resistance are further improved by irradiating the multilayered container with an electron beam from the interior. It is also clear that a multilayered container having a specific radical concentration excels in oxygen barrier properties and delamination resistance.

The present invention will be described in detail below.

<Polyester Layer>

The multilayered container of the present invention includes a polyester layer containing a thermoplastic polyester resin (X). The polyester layer is at least an innermost layer of the multilayered container, and the polyester layer as the innermost layer is preferably disposed in direct contact with the polyamide layer.

(Thermoplastic Polyester Resin (X))

The thermoplastic polyester resin (X) (hereinafter, also simply referred to as "polyester resin (X)") contained in the polyester layer will be described below. In the present invention, among polyester resins, a polyester resin exhibiting thermoplastic properties is used as the polyester resin (X). Furthermore, a polyester resin that exhibits a thermosetting property is also present in an unsaturated polyester.

The thermoplastic polyester resin (X) is preferably a polycondensation polymer of a dicarboxylic acid and a diol. The constituent unit derived from a dicarboxylic acid (hereinafter, also referred to as a "dicarboxylic acid unit") is preferably a constituent unit derived from an aromatic dicarboxylic acid, and the constituent unit derived from a diol (hereinafter, also referred to as a "diol unit") is preferably a constituent unit derived from an aliphatic diol. Note that as the dicarboxylic acid, in addition to dicarboxylic acid, an ester of a dicarboxylic acid may be used, and specific preferable examples include $C_{1-4}$ alkyl esters of dicarboxylic acids.

Examples of aromatic dicarboxylic acids include terephthalic acid, isophthalic acid, orthophthalic acid, biphenyl dicarboxylic acid, diphenyl ether dicarboxylic acid, diphenylsulfone dicarboxylic acid, diphenylketone dicarboxylic acid, 2,6-naphthalene dicarboxylic acid, 1,4-naphthalene dicarboxylic acid, and 2,7-naphthalene dicarboxylic acid. Terephthalic acid, isophthalic acid, orthophthalic acid, naphthalene dicarboxylic acids, and 4,4'-biphenyl dicarboxylic acid are preferable, and isophthalic acid and terephthalic acid are even more preferable. As described above, as the aromatic dicarboxylic acid, a $C_{1-4}$ alkyl ester of aromatic dicarboxylic acids may be used.

Examples of aromatic dicarboxylic acids include sulfophthalic acids and metal sulfophthalates. The sulfophthalic acids and metal sulfophthalates are represented by Formulas (I) and (I') below, respectively.

[Chem. 1]

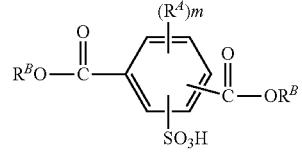
(I)

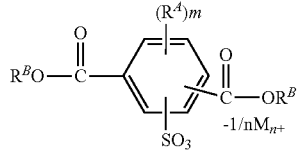
(I')

In Formula (I') above, M is a metal atom, and n denotes the valence of M.

Examples of the metal atom M include alkali metals such as lithium, sodium, and potassium; and alkaline earth metals such as beryllium, magnesium, calcium, and strontium. Of these, an alkali metal is preferable, in which sodium or lithium is preferable, and sodium is more preferable. Note that when n is 2 or greater, crosslinking with other units (for example, sulfo groups in other sulfophthalic acid units or metal sulfophthalate units) through M may occur.

In Formulas (I) and (I') above, $R^A$ is a substituted or unsubstituted alkyl group or a substituted or unsubstituted aryl group, and m denotes an integer from 0 to 3. Note that when m is 2 or 3, each $R^A$ may be the same or different.

Examples of the alkyl group include a methyl group, ethyl group, n-propyl group, isopropyl group, n-butyl group, t-butyl group, n-octyl group, and 2-ethylhexyl group. Among these, an alkyl group having from 1 to 6 carbons is preferable, and an alkyl group having from 1 to 4 carbons is more preferable.

Examples of the aryl group include a phenyl group and a naphthyl group. Among these, an aryl group having from 6 to 12 carbons is preferable, and a phenyl group is more preferable.

Examples of the substituents possessed by the alkyl group and the aryl group include halogen atoms such as a chlorine atom, a bromine atom, or an iodine atom, an alkyl group, alkenyl group, aryl group, cyano group, hydroxyl group, nitro group, alkoxy group, aryloxy group, acyl group, amino group, mercapto group, alkylthio group, and an arylthio group. Among these groups, those having a hydrogen atom may be further substituted with the substituents described above.

Specific examples of the $R^A$ include a methyl group, ethyl group, n-propyl group, isopropyl group, n-butyl group, t-butyl group, 1-methylpropyl group, 2-methylpropyl group, hydroxymethyl group, 1-hydroxyethyl group, mercaptomethyl group, methyl thioethyl group, phenyl group, naphthyl groups, biphenyl group, benzyl group, and a 4-hydroxybenzyl group. and of these, a methyl group, ethyl group, and benzyl group are preferable.

In Formulas (I) and (I') above, $R^B$ denotes a hydrogen atom or an alkyl group having from 1 to 4 carbons.

The preferred $R^A$ is as described above, but the sulfophthalic acid or metal sulfophthalate used in the polyester resin (X) is preferably a unit represented by Formula (Ia) or (I'a) below, respectively, in which m=0, or in other words, the benzene ring is not substituted by $R^A$.

[Chem. 2]

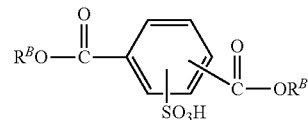
(Ia)

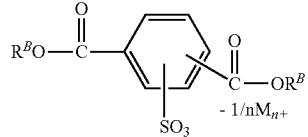
(I'a)

In Formula (Ia) above, $R^B$ is the same as $R^B$ in Formula (I).

Moreover, in Formula (I'a) above, $R^B$, M, and n are the same as the $R^B$, M, and n in Formula (I').

Furthermore, examples of the sulfophthalic acid represented by Formula (Ia) or the metal sulfophthalate represented by Formula (I'a) include phthalic acid structures in which two —CO— are bonded at the ortho position, isophthalic acid structures in which two —CO— are bonded at the meta position, and terephthalic acid structures in which two —CO— are bonded at the para position. Among these, an isophthalic acid structure is preferable. In other words, the sulfophthalic acid or metal sulfophthalate is preferably at least one of a sulfoisophthalic acid represented by Formula (Ib) below or a metal sulfoisophthalate represented by Formula (I'b) below.

[Chem 3.]

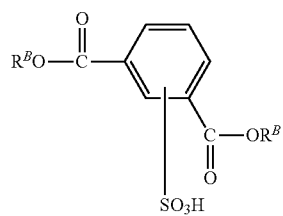
(Ib)

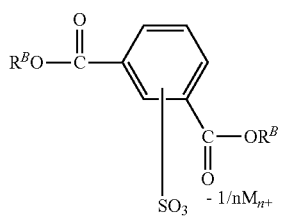
(I'b)

In Formula (Ib) above, $R^B$ is the same as $R^B$ in Formula (I).

Moreover, in Formula (I'b) above, $R^B$, M, and n are the same as the $R^B$, M, and n in Formula (I').

The position of the sulfo group in the sulfoisophthalic acid or the metal sulfoisophthalate may be the 2-, 4-, 5-, and 6-positions, but is preferably substituted at the 5-position as represented by Formula (Ic) or (I'c) below.

[Chem. 4]

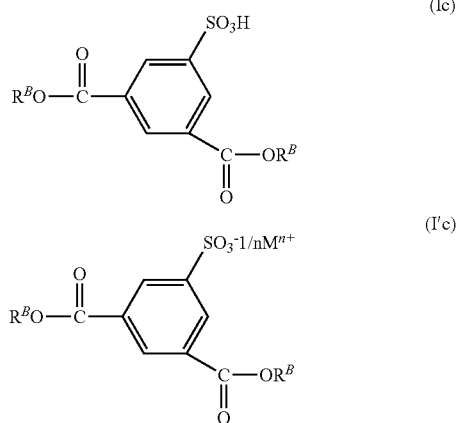

In Formula (Ic) above, $R^B$ is the same as $R^B$ in Formula (I).

Moreover, in Formula (I'c) above, $R^B$, M, and n are the same as the $R^B$, M, and n in Formula (I').

In the polyester resin (X), examples of the sulfoisophthalic acid represented by formula (Ic) or the metal sulfoisophthalate represented by formula (I'c) include 5-sulfoisophthalic acid, sodium 5-sulfoisophthalate, lithium 5-sulfoisophthalate, potassium 5-sulfoisophthalate, calcium bis(5-sulfoisophthalate), sodium dimethyl 5-sulfoisophthalate, and sodium diethyl 5-sulfoisophthalate.

In a case where the polyester resin (X) contains a constituent unit derived from at least one selected from the group consisting of sulfophthalic acids and metal sulfophthalates, the resin preferably contains a constituent unit derived from at least a metal sulfophthalate. The content of the constituent units derived from a sulfophthalic acid and a metal sulfophthalate in the polyester resin is preferably from 0.01 to 15 mol %, more preferably from 0.03 to 10.0 mol %, even more preferably from 0.06 to 5.0 mol %, and yet even more preferably from 0.08 to 2.0 mol %.

Examples of the aliphatic diol include aliphatic diols having a linear or branched structure, such as ethylene glycol, 2-butene-1,4-diol, trimethylene glycol, tetramethylene glycol, hexamethylene glycol, neopentyl glycol, methylpentanediol, and diethylene glycol; and alicyclic diols, such as cyclohexane dimethanol, isosorbide, spiro glycol, 2,2,4,4-tetramethyl-1,3-cyclobutanediol, norbornene dimethanol, and tricyclodecane dimethanol. Among these, ethylene glycol, neopentyl glycol, and cyclohexane dimethanol are preferable, and ethylene glycol is more preferable.

It is also preferred that the polyester resin contains, as the constituent unit derived from a diol, a constituent unit derived from an alicyclic diol. The alicyclic diol is preferably at least one alicyclic diol selected from the group consisting of cyclohexane dimethanol, isosorbide, spiro glycol, and 2,2,4,4-tetramethyl-1,3-cyclobutanediol. In the case where the aforementioned constituent unit derived from an alicyclic diol is contained, the content thereof is preferably from 1 to 50 mol %, more preferably from 2 to 40 mol %, still more preferably from 3 to 30 mol %, and yet even more preferably from 5 to 25 mol % of all constituent units derived from a diol.

The thermoplastic polyester resin (X) used in the present invention preferably includes a thermoplastic polyester resin in which 50 mol % or greater of the constituent units derived from a dicarboxylic acid (dicarboxylic acid unit) are constituent units derived from an aromatic dicarboxylic acid, and 50 mol % or greater of the constituent units derived from a diol (diol unit) are constituent units derived from an aliphatic diol; and more preferably, the thermoplastic polyester resin (X) includes a thermoplastic polyester resin (X-1) in which 50 mol % or greater of the dicarboxylic acid units are constituent units derived from terephthalic acid, and 50 mol % or greater of the diol units are constituent units derived from ethylene glycol.

The thermoplastic polyester resin (X-1) is more preferably one in which 80 mol % or greater of the dicarboxylic acid units are constituent units derived from terephthalic acid, and 80 mol % or greater of the diol units are constituent units derived from ethylene glycol; and is even more preferably one in which 90 mol % or greater of the dicarboxylic acid units are constituent units derived from terephthalic acid, and 90 mol % or greater of the diol units are constituent units derived from ethylene glycol.

Note that in the following description, a thermoplastic polyester resin (X-1) in which at least 50 mol % of the dicarboxylic acid units are constituent units derived from terephthalic acid, and at least 50 mol % of the diol units are constituent units derived from ethylene glycol is also referred to as polyethylene terephthalate.

When the proportion of the constituent units derived from terephthalic acid is set to 50 mol % or greater of all dicarboxylic acid units as described above, the polyester resin is less likely to be amorphous, and therefore, the multilayered container is less prone to thermal shrinkage, for example, when the interior is filled with a high temperature material, and the multilayered container exhibits good heat resistance.

When the thermoplastic polyester resin (X) uses polyethylene terephthalate (the thermoplastic polyester resin (X-1)), the thermoplastic polyester resin (X) may be constituted of polyethylene terephthalate alone, or may contain a polyester resin other than polyethylene terephthalate in addition to the polyethylene terephthalate. The polyethylene terephthalate is preferably contained at an amount from 80 to 100 mass %, and more preferably from 90 to 100 mass %, relative to the total amount of the thermoplastic polyester resin (X).

Preferred aspects of the polyethylene terephthalate (polyester resin (X-1)) are described below.

The polyethylene terephthalate may be one containing a constituent unit derived from a bifunctional compound other than terephthalic acid and ethylene glycol, and examples of the bifunctional compound include the aforementioned aromatic dicarboxylic acids and aliphatic diols other than terephthalic acid and ethylene glycol, as well as bifunctional compounds other than aromatic dicarboxylic acids and aliphatic diols. Here, the constituent unit derived from the bifunctional compound other than terephthalic acid and ethylene glycol accounts for preferably 20 mol % or less, and more preferably 10 mol % or less relative to the total moles of all constituent units constituting the polyester resin.

Note that, even in the case where the polyester resin is a polyester resin other than polyethylene terephthalate, the polyester resin may be one containing a constituent unit derived from a bifunctional compound other than aliphatic diols and aromatic dicarboxylic acids.

Examples of the bifunctional compound other than aliphatic diols and aromatic dicarboxylic acids include aliphatic bifunctional compounds other than aliphatic diols, and aromatic bifunctional compounds other than aromatic dicarboxylic acids.

Examples of the aliphatic bifunctional compounds other than aliphatic diols include linear or branched aliphatic bifunctional compounds. Specifically, examples thereof include aliphatic dicarboxylic acids, such as malonic acid, succinic acid, adipic acid, azelaic acid, and sebacic acid; and aliphatic hydroxycarboxylic acids, such as 10-hydroxyoctadecanoic acid, lactic acid, hydroxyacrylic acid, 2-hydroxy-2-methylpropionic acid, and hydroxybutyric acid.

The aforementioned aliphatic bifunctional compound may also be an alicyclic bifunctional compound, including, for example, alicyclic dicarboxylic acids, such as cyclohexane dicarboxylic acid, norbornene dicarboxylic acid, and tricyclodecane dicarboxylic acid; and alicyclic hydroxycarboxylic acids, such as hydroxymethyl cyclohexane carboxylic acid, hydroxymethyl norbornene carboxylic acid, and hydroxymethyl tricyclodecane carboxylic acid.

Among these, preferred examples of the alicyclic bifunctional compound include 1,2-cyclohexane dicarboxylic acid, 1,3-cyclohexane dicarboxylic acid, and 1,4-cyclohexane dicarboxylic acid. A copolymerized polyester resin containing a constituent unit derived from such alicyclic bifunctional compounds is easily produced, and the drop impact strength and transparency of the multilayered container can be improved. Of the alicyclic bifunctional compounds described above, 1,4-cyclohexane dicarboxylic acid is more preferable because it is readily available and has a high drop impact strength.

The aromatic bifunctional compound other than aromatic dicarboxylic acids is not particularly limited, and specific examples thereof include aromatic hydroxycarboxylic acids, such as hydroxybenzoic acid, hydroxytoluic acid, hydroxynaphthoic acid, 3-(hydroxyphenyl)propionic acid, hydroxyphenylacetic acid, and 3-hydroxy-3-phenylpropionic acid; and aromatic diols, such as bisphenol compounds and hydroquinone compounds.

In the case where the polyethylene terephthalate contains a constituent unit derived from an aromatic dicarboxylic acid other than terephthalic acid, the aromatic dicarboxylic acid is preferably selected from the group consisting of isophthalic acid, orthophthalic acid, naphthalene dicarboxylic acid, and 4,4'-biphenyldicarboxylic acid. These compounds are low in cost, and a copolymerized polyester resin containing one type of these compounds is easily produced. When the polyethylene terephthalate contains a constituent unit derived from these aromatic dicarboxylic acids, the proportion of the constituent unit derived from an aromatic dicarboxylic acid is preferably from 1 to 20 mol %, and more preferably from 1 to 10 mol % of the dicarboxylic acid units.

Among these, the aromatic dicarboxylic acid is especially preferably isophthalic acid or naphthalene dicarboxylic acid, and most preferably isophthalic acid. The polyethylene terephthalate containing a constituent unit derived from isophthalic acid excels in moldability, and is also excellent from the standpoint of preventing whitening of a molded article due to the low crystallization rate. In addition, the polyethylene terephthalate containing a constituent unit derived from naphthalene dicarboxylic acid increases the glass transition point of the resin, improves the heat resistance, and absorbs ultraviolet rays, and therefore, such polyethylene terephthalate is suitably used in the production of a multilayered container requiring resistance to ultraviolet rays. Note that a 2,6-naphthalene dicarboxylic acid component is preferable as the naphthalene dicarboxylic acid because it is easy to be produced and is highly economical.

The polyethylene terephthalate may possibly contain a trace amount of diethylene glycol by-product units, which are a dimer of the ethylene glycol component, and are formed in a trace amount in the process of producing the polyethylene terephthalate. In order for the multilayered container to maintain good physical properties, the proportion of diethylene glycol units in the polyester resin is preferably as low as possible. The proportion of constituent units derived from diethylene glycol is preferably not greater than 3 mol %, more preferably not greater than 2 mol %, and even more preferably not greater than 1 mol %, relative to the total constituent units of the polyester resin.

The thermoplastic polyester resin (X) may contain another thermoplastic polyester resin in addition to the above-described polyester resin (X-1). Examples of the other thermoplastic polyester resin include a polyester resin (X-2) constituted from a constituent unit derived from a dicarboxylic acid and a constituent unit derived from a diol, in which at least 80 mol % (preferably at least 85 mol %, more preferably at least 90 mol %, and even more preferably at least 95 mol %) of the constituent units derived from a dicarboxylic acid are derived from at least one type selected from terephthalic acid, naphthalene dicarboxylic acid, and esters thereof, and of the constituent units derived from a diol, from 5 to 60 mol % (preferably from 15 to 60 mol %) is derived from spiroglycol and from 95 to 40 mol % (preferably from 85 to 40 mol %) is derived from ethylene glycol.

The polyester resin (X-2) is preferably an amorphous polyester resin.

Another example of other amorphous polyester resins is a polyester resin (X-3) constituted from a constituent unit derived from a dicarboxylic acid and a constituent unit derived from a diol, in which at least 80 mol % (preferably at least 85 mol %, more preferably at least 90 mol %, and even more preferably at least 95 mol %) of the constituent units derived from a dicarboxylic acid are derived from at least one type selected from terephthalic acid, naphthalene dicarboxylic acid, and esters thereof, and of the constituent units derived from a diol, from 90 to 10 mol % (preferably from 85 to 40 mol %) is derived from 1,4-cyclohexane dimethanol, and from 10 to 90 mol % (preferably from 15 to 60 mol %) is derived from ethylene glycol.

As the thermoplastic polyester resin (X), the polyester resins described in paragraphs [0010] to [0021] of JP 2006-111718 A, the polyester resins described in JP 2017-105873 A, and the polyester resins described in WO 2013/168804 can be referenced, and the contents of the disclosures thereof are incorporated herein.

The thermoplastic polyester resin (X) may include constituent units derived from a monofunctional compound such as a monocarboxylic acid and a monoalcohol. Specific examples of these compound include aromatic monofunctional carboxylic acids, such as benzoic acid, o-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzoic acid, 1-naphthoic acid, 2-naphthoic acid, 2-biphenylcarboxylic acid, 1-naphthalene acetic acid, and 2-naphthalene acetic acid; aliphatic monocarboxylic acids, such as propionic acid, butyric acid, n-octanoic acid, n-nonanoic acid, myristic acid, pentadecanoic acid, stearic acid, oleic acid, linoleic acid, and linolenic acid; aromatic monoalcohols, such as benzyl alcohol, 2,5-dimethylbenzyl alcohol, 2-phenethyl alcohol, phenol, 1-naphthol, and 2-naphthol; and aliphatic or alicyclic monoalcohols, such as butyl alcohol, hexyl alcohol, octyl alcohol, pentadecyl alcohol, stearyl alcohol, polyethylene glycol monoalkyl ether, polypropylene glycol monoalkyl ether, polytetramethylene glycol monoalkyl ether, oleyl alcohol, and cyclododecanol.

Among these, from the viewpoints of ease of the production of polyester and production costs thereof, benzoic acid, 2,4,6-trimethoxybenzoic acid, 2-naphthoic acid, stearic acid, and stearyl alcohol are preferred. The proportion of constituent units derived from the monofunctional compound is preferably not greater than 5 mol %, more preferably not greater than 3%, and even more preferably not greater than 1%, relative to the total moles of all constituent units of the polyester resin. The monofunctional compound functions as a terminal-capping agent for terminal groups or branched chains of the polyester resin molecular chain, thereby suppressing an excessive increase of the molecular weight of the polyester resin and preventing the occurrence of gelation.

Furthermore, in order to obtain necessary physical properties, the thermoplastic polyester resin (X) may contain, as a copolymerization component, a polyfunctional compound having at least three groups selected from carboxy groups, hydroxy groups, and ester-forming groups thereof. Examples of the polyfunctional compound include aromatic polycarboxylic acids, such as trimesic acid, trimellitic acid, 1,2,3-benzenetricarboxylic acid, pyromellitic acid, and 1,4,5,8-naphthalene tetracarboxylic acid; alicyclic polycarboxylic acids, such as 1,3,5-cyclohexane tricarboxylic acid; aromatic polyhydric alcohols, such as 1,3,5-trihydroxybenzene; aliphatic or alicyclic polyhydric alcohols, such as trimethylolpropane, pentaerythritol, glycerin, and 1,3,5-cyclohexanetriol; aromatic hydroxycarboxylic acids, such as 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, gallic acid, and 2,4-dihydroxyphenyl acetic acid; aliphatic hydroxycarboxylic acids, such as tartaric acid, and malic acid; and esters thereof.

The proportion of the constituent unit derived from a polyfunctional compound in the polyester resin is preferably less than 0.5 mol % relative to the total moles of all constituent units of the polyester.

From the viewpoints of reactivity and production costs, of the foregoing, examples of preferred polyfunctional compounds include trimellitic acid, pyromellitic acid, trimesic acid, trimethylolpropane, and pentaerythritol.

A known method such as direct esterification and transesterification can be applied for the production of the thermoplastic polyester resin (X). Examples of a polycondensation catalyst used for producing the polyester resin include, but are not limited to, known antimony compounds such as antimony trioxide and antimony pentaoxide, germanium compounds such as germanium oxide, and aluminum compounds such as aluminum chloride. In addition, examples of other production methods include a method of subjecting different types of polyester resins to trans-esterification through a long dwell time and/or high-temperature extrusion.

The thermoplastic polyester resin (X) may also contain a regenerated polyester resin, or a material derived from a used polyester or an industrially recycled polyester (for example, a polyester monomer, a catalyst, and an oligomer).

One type of polyester resin may be used alone, or two or more types of polyester resins may be combined and used.

The intrinsic viscosity of the thermoplastic polyester resin (X) is not particularly limited, but is preferably from 0.5 to 2.0 dL/gm and more preferably from 0.6 to 1.5 dL/g. The molecular weight of the polyester resin is sufficiently high when the intrinsic viscosity is greater than or equal to 0.5 dL/g, and therefore the multilayered container can exhibit the mechanical properties necessary as a structure.

Note that the intrinsic viscosity is obtained by dissolving the polyester resin to be measured in a mixed solvent of phenol/1,1,2,2-tetrachloroethane (=6/4 mass ratio) to prepare 0.2, 0.4, and 0.6 g/dL solutions, after which the intrinsic viscosity is measured at 25° C. using an automatic viscosity measuring apparatus (Viscotek, available from Malvern Instruments Limited).

<Polyamide Layer>

The multilayered container of the present invention has a polyamide layer containing a specific polyamide resin (Y-1) as the polyamide resin (Y). The polyamide layer is an intermediate layer. Additionally, based on an overall thickness of 100%, the polyamide layer is present from a position of 5 to 35% from the inner surface, and the polyamide layer has a thickness from 1 to 15%.

In the present invention, the multilayered container can have a high gas barrier property by including a polyamide resin layer that contains the specific polyamide resin (Y-1) described above. Thus, oxygen can be prevented from entering through the container wall from the outside. Furthermore, as described below, surprisingly, arranging a polyamide layer of a specific thickness at a specific position provides a greater oxygen barrier property and suppresses delamination from the polyester layer.

The polyamide resin (Y) contained in the polyamide layer will be described below in detail.

(Polyamide Resin (Y))

The polyamide resin (Y) includes a polyamide resin (Y-1) including a constituent unit derived from a diamine (hereinafter, also referred to as a "diamine unit") and a constituent unit derived from a dicarboxylic acid (hereinafter, also referred to as a "dicarboxylic acid unit"), wherein at least 70 mol % of constituent units derived from a diamine (diamine units) are constituent units derived from a xylylenediamine, and at least 70 mol % of constituent units derived from a dicarboxylic acid (dicarboxylic acid units) are constituent units derived from α,ω-linear aliphatic dicarboxylic acids having from 4 to 20 carbons.

In the polyamide resin (Y-1) of the present invention, of the constituent units derived from a diamine (diamine units), constituent units derived from a xylylenediamine account for at least 70 mol %, preferably from 80 to 100 mol %, and even more preferably from 90 to 100 mol %.

The xylylenediamine is preferably meta-xylylenediamine, para-xylylenediamine, or both, and is more preferably meta-xylylenediamine. Furthermore, preferably at least 50 mol %, more preferably at least 70 mol %, even more preferably from 80 to 100 mol %, and yet even more preferably from 90 to 100 mol % of the diamine units constituting the polyamide resin are constituent units derived from meta-xylylenediamine. When the amount of constituent units derived from meta-xylylenediamine in the diamine units is within the aforementioned range, the gas barrier properties of the polyamide resin (Y-1) are further improved.

The diamine units in the polyamide resin (Y-1) may include only constituent units derived from xylylenediamine, or may include constituent units derived from diamines other than xylylenediamine. Here, examples of diamines other than xylylenediamine include, but are not limited to, aliphatic diamines having a linear or branched structure, such as ethylenediamine, tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethyl-hexamethylenediamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as bis(4-aminophenyl)ether, paraphenylenediamine, and bis(aminomethyl)naphthalene.

In the polyamide resin (Y-1), 70 mol % or more of the constituent units derived from a dicarboxylic acid are derived from an α,ω-linear aliphatic dicarboxylic acid having from 4 to 20 carbons. Examples of the α,ω-linear aliphatic dicarboxylic acid having from 4 to 20 carbons include succinic acid, glutaric acid, adipic acid, pimelic acid, suberic acid, azelaic acid, sebacic acid, undecanedioic acid, and dodecanedioic acid. Among these, adipic acid and sebacic acid are preferable.

The polyamide resin (Y-1) preferably contains, of the constituent units derived from a dicarboxylic acid, constituent units derived from α,ω-linear aliphatic dicarboxylic acids having from 4 to 20 carbons, at a proportion of at least 70 mol %, preferably from 80 to 100 mol %, and more preferably from 90 to 100 mol %.

The dicarboxylic acid units in the polyamide resin (Y-1) may consist of only constituent units derived from α,ω-linear aliphatic dicarboxylic acids having from 4 to 20 carbons, but may also contain constituent units other than constituent units derived from α,ω-linear aliphatic dicarboxylic acids having from 4 to 20 carbons.

Examples of dicarboxylic acids other than α,ω-linear aliphatic dicarboxylic acids having from 4 to 20 carbons include, but are not limited to, alicyclic dicarboxylic acids such as 1,4-cyclohexane dicarboxylic acid; other aliphatic dicarboxylic acids such as dimer acids; and aromatic dicarboxylic acids such as terephthalic acid, isophthalic acid, orthophthalic acid, xylylene dicarboxylic acid, and naphthalene dicarboxylic acid.

Furthermore, in the polyamide resin (Y-1), it is especially preferable that at least 70 mol % of the diamine units are constituent units derived from a xylylenediamine (preferably, meta-xylylenediamine), and at least 70 mol % of the dicarboxylic acid units are constituent units derived from adipic acid; and it is most preferable that at least 80 mol % of the diamine units are constituent units derived from xylylenediamine (preferably meta-xylylenediamine), and at least 80 mol % of the dicarboxylic acid units are constituent units derived from adipic acid. The polyamide resin (Y-1) having such constituent units exhibits good gas barrier properties, and the processability of the multilayered container is good because the molding processability closely resembles that of a thermoplastic polyester resin (X) such as polyethylene terephthalate. In this polyamide resin (Y-1), one or more α,ω-linear aliphatic dicarboxylic acids having from 4 to 20 carbons (excluding adipic acid) are preferably used as the compound constituting the dicarboxylic acid unit other than adipic acid.

Furthermore, examples of the preferred polyamide resin (Y-1) are polyamide resins in which 70 mol % or more of the diamine units are constituent units derived from xylylenediamine (preferably meta-xylylenediamine), from 70 to 99 mol % of the dicarboxylic acid units are constituent units derived from adipic acid, and from 1 to 30 mol % of the dicarboxylic acid units are constituent units derived from isophthalic acid. The polyamide resin is more preferably a polyamide resin in which 80 mol % or more of the diamine units are constituent units derived from xylylenediamine (preferably meta-xylylenediamine), from 80 to 99 mol % of dicarboxylic acid units are constituent units derived from adipic acid, and from 1 to 20 mol % are constituent units derived from isophthalic acid.

Adding an isophthalic acid unit as a dicarboxylic acid unit reduces the melting point, and as a result, the molding processing temperature can be lowered, and therefore thermal deterioration during molding can be suppressed, and stretching moldability is improved by delaying the crystallization time.

From the viewpoints of moldability and oxygen barrier properties, the number average molecular weight of the polyamide resin (Y-1) is preferably not less than 10000, more preferably not less than 15000, and preferably not greater than 100000, more preferably not greater than 50000, and even more preferably not greater than 40000. The number average molecular weight is measured according to the method described in paragraph [0016] of WO 2017/090556.

The polyamide resin (Y-1) is preferably a crystalline resin, and from the perspective of molding ease, the melting point thereof is preferably from 190° C. to 300° C., more preferably from 200° C. to 270° C., and even more preferably from 210° C. to 250° C.

The glass transition temperature of the polyamide resin (Y-1) is preferably from 75 to 95° C. from the perspective of molding ease.

In the present invention, from the viewpoint of oxygen barrier properties, the content of the polyamide resin (Y-1) in the polyamide resin (Y) is preferably at least 20 mass %, more preferably at least 30 mass %, even more preferably at least 50 mass %, yet even more preferably at least 60 mass %, and still even more preferably at least 70 mass %, and may be 100 mass %.

In the present invention, the polyamide resin (Y) may contain another polyamide resin in addition to the polyamide resin (Y-1). An example of the other polyamide resin is a polyamide resin (Y-2) containing a constituent unit derived from a diamine and a constituent unit derived from a dicarboxylic acid, in which at least 70 mol % of the constituent units derived from a diamine are derived from a xylylenediamine, and of the constituent units derived from a dicarboxylic acid, from 30 to 65 mol % are derived from an α,ω-linear aliphatic dicarboxylic acid having from 4 to 20 carbons, and from 70 to 35 mol % are derived from isophthalic acid (provided that the total does not exceed 100 mol %).

By compounding such a polyamide resin (Y-2), the transparency and oxygen barrier properties can be further improved. The polyamide resin (Y-2) used in the present invention is typically an amorphous resin. By using an amorphous resin, transparency of the multilayered container can be further improved.

In the polyamide resin (Y-2), 70 mol % or more, preferably 80 mol % or greater, more preferably 90 mol % or greater, even more preferably 95 mol % or greater, and yet even more preferably 99 mol % or greater of the constituent units derived from a diamine are derived from xylylenediamine. The xylylenediamine is preferably meta-xylylenediamine and para-xylylenediamine, and is more preferably meta-xylylenediamine.

An example of a preferred embodiment of the polyamide resin (Y-2) of the present invention is a polyamide resin in which at least 70 mol % of the constituent units derived from a diamine are derived from meta-xylylenediamine.

Examples of the diamine other than xylylenediamine include aromatic diamines such as para-phenylenediamine, and aliphatic diamines, such as 1,3-bis(aminomethyl)cyclohexane, 1,4-bis(aminomethyl)cyclohexane, tetramethylene diamine, pentamethylene diamine, hexamethylene diamine, octamethylene diamine, and nonamethylene diamine. A single type of these other diamines may be used, or two or more types thereof may be used.

In a case where a diamine other than xylylenediamine is used as the diamine component, the diamine thereof is used at a proportion of preferably 30 mol % or less, more preferably from 1 to 25 mol %, and particularly preferably from 5 to 20 mol %, of the constituent unit derived from a diamine.

In the present invention, as described above, of the constituent units derived from a dicarboxylic acid in the polyamide resin (Y-2), from 30 to 65 mol % are derived from an α,ω-linear aliphatic dicarboxylic acid having from 4 to 20 carbons (preferably, an α,ω-linear aliphatic dicarboxylic acid having from 4 to 8 carbons, and more preferably adipic acid), and from 70 to 35 mol % are derived from isophthalic acid.

Of all dicarboxylic acids constituting the constituent unit derived from a dicarboxylic acid in the polyamide resin (Y-2), a lower limit of the proportion of isophthalic acid is not less than 35 mol %, preferably not less than 40 mol %, and more preferably not less than 41 mol %. The upper limit of the proportion of the isophthalic acid is not greater than 70 mol %, preferably not greater than 67 mol %, more preferably not greater than 65 mol %, even more preferably not greater than 62 mol %, and yet even more preferably not greater than 60 mol %, and may be not greater than 58 mol %.

Setting the proportion of the isophthalic acid to such a range tends to further improve the oxygen barrier property of the multilayered container of the present invention.

Among all of the dicarboxylic acids constituting the constituent unit derived from a dicarboxylic acid in the polyamide resin (Y-2), the lower limit of the proportion of α,ω-linear aliphatic dicarboxylic acids having from 4 to 20 carbons (preferably, α,ω-linear aliphatic dicarboxylic acid having from 4 to 8 carbons, and more preferably adipic acid) is not less than 30 mol %, preferably not less than 33 mol %, more preferably not less than 35 mol %, even more preferably not less than 38 mol %, and yet even more preferably not less than 40 mol %, and may even be not less than 42 mol %. The upper limit of the proportion of the α,ω-linear aliphatic dicarboxylic acid having from 4 to 20 carbons is not greater than 65 mol %, preferably not greater than 60 mol %, and more preferably not greater than 59 mol %. Setting the proportion of the α,ω-linear aliphatic dicarboxylic acids having from 4 to 20 carbons to such a range tends to further improve the oxygen barrier property of the multilayered container of the present invention.

As described above, the α,ω-linear aliphatic dicarboxylic acid having from 4 to 20 carbons is preferably an α,ω-linear aliphatic dicarboxylic acid having from 4 to 8 carbons.

Examples of the α,ω-linear aliphatic dicarboxylic acid having from 4 to 20 carbons that is preferably used as the raw material dicarboxylic acid component of the polyamide resin (Y-2) include aliphatic dicarboxylic acids, such as succinic acid, glutaric acid, pimelic acid, suberic acid, azelaic acid, adipic acid, sebacic acid, undecanedioic acid, and dodecanedioic acid. A single type thereof can be used, or two or more types thereof can be mixed and used. Among these, adipic acid is preferable because the melting point of the polyamide resin is within an appropriate range for molding.

Of all dicarboxylic acids constituting the constituent unit derived from a dicarboxylic acid in the polyamide resin (Y-2), the total proportion of isophthalic acid and the α,ω-linear aliphatic dicarboxylic acid having from 4 to 20 carbons is preferably not less than 90 mol %, more preferably not less than 95 mol %, and even more preferably not less than 98 mol %, and may be 100 mol %. Setting the total proportion of isophthalic acid and the α,ω-linear aliphatic dicarboxylic acid having from 4 to 20 carbons to such a proportion tends to further improve the transparency of the multilayered container of the present invention.

Examples of dicarboxylic acids besides isophthalic acid and α,ω-linear aliphatic dicarboxylic acids having from 4 to 20 carbons include phthalic acid compounds, such as terephthalic acid and orthophthalic acid; and naphthalene dicarboxylic acids such as isomers including 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used alone, or two or more types can be mixed and used.

The polyamide resin (Y-2) is preferably substantially free of a constituent unit derived from terephthalic acid. Substantially free means 5 mol % or less, preferably 3 mol % or less, and even more preferably 1 mol % or less, of the moles of isophthalic acid contained in the polyamide resin (Y-2). With such a configuration, suitable moldability is maintained, and the gas barrier property is less likely to change due to humidity.

Note that the polyamide resin (Y-2) is constituted from a constituent unit derived from a dicarboxylic acid and a constituent unit derived from a diamine, and may also include a constituent unit besides the constituent unit derived from a dicarboxylic acid and the constituent unit derived from a diamine, or other moieties such as terminal groups. Examples of other constituent units include, but are not limited to, a constituent unit derived from a lactam such as ε-caprolactam, valerolactam, laurolactam, and undecalactam; and aminocarboxylic acids such as 11-aminoundecanoic acid and 12-aminododecanoic acid. The polyamide resin (Y-2) may also include trace amounts of components such as additives used for synthesis. Typically 95 mass % or greater, and preferably 98 mass % or greater of the polyamide resin (Y-2) is a constituent unit derived from a dicarboxylic acid or a constituent unit derived from a diamine.

The number average molecular weight (Mn) of the polyamide resin (Y-2) is preferably 8000 or greater, and more preferably 10000 or greater. The upper limit of the number average molecular weight of the polyamide resin (Y-2) is not particularly established, but may be, for example, not greater than 50000, not greater than 30000, or not greater than 20000. An example of an embodiment of the present invention is an aspect in which the Mn of the polyamide resin (Y-2) is smaller than the Mn of the polyamide resin (Y-1). More preferably, the Mn of the polyamide resin (Y-2) is smaller than the Mn of the polyamide resin (Y-1) by 5000 or greater, more preferably smaller by 8000 or greater, and even more preferably smaller by 10000 or greater. An example of the upper limit of a difference between the Mn of the polyamide resin (Y-2) and the Mn of the polyamide resin (Y-1) is 25000 or less. With such a configuration, the dispersibility and miscibility of the polyamide resin (Y-1) and the polyamide resin (Y-2) are favorable, and the transparency and gas barrier properties tend to be more superior.

The glass transition temperature of the polyamide resin (Y-2) is preferably higher than 90° C. but not higher than 150° C., more preferably from 95 to 145° C., even more preferably from 101 to 140° C., and yet even more preferably from 120 to 135° C. Such a configuration tends to further improve the delamination resistance of a multilayered container.

In the present invention, from the viewpoints of delamination resistance, transparency, and barrier properties, the content of the polyamide resin (Y-2) in the polyamide resin (Y) is preferably not less than 10 mass %, more preferably not less than 20 mass %, and even more preferably not less than 30 mass %, and is preferably not greater than 80 mass %, more preferably not greater than 70 mass %, and even more preferably not greater than 50 mass %.

In the present invention, the total content of the polyamide resin (Y-1) and the polyamide resin (Y-2) in the polyamide resin (Y) is preferably not less than 50 mass %, more preferably not less than 70 mass %, and even more preferably not less than 90 mass %, and may be 100 mass %.

Furthermore, one type each of the polyamide resin (Y-1) and the polyamide resin (Y-2) may be used alone, or two or more types each may be used in combination.

Furthermore, besides the above-mentioned diamine and dicarboxylic acid components, lactams such as ε-caprolactam and laurolactam; aliphatic aminocarboxylic acids such as aminocaproic acid and aminoundecanoic acid; and aromatic aminocarboxylic acids such as p-aminomethylbenzoic acid can also be used as copolymer components constituting the polyamide resin (Y-2), within a range that does not impair the effect of the present invention.

In the present invention, the polyamide resin is preferably produced by a polycondensation reaction (hereinafter, also referred to as "melt polycondensation") in a molten state. For example, it is preferred that the polyamide resin is produced by a method in which a nylon salt composed of a diamine and a dicarboxylic acid is subjected to a temperature increase using a pressurization method in the presence of water, and is polymerized in a molten state while removing the added water and condensed water. In addition, the polyamide resin may also be produced by a method in which the diamine is added directly to molten dicarboxylic acid, and the contents are polycondensed under atmospheric pressure. In this case, in order to maintain the reaction system in a uniform liquid state, preferably, the diamine is continuously added to the dicarboxylic acid, and during that time, polycondensation is allowed to proceed while increasing the temperature of the reaction system such that the reaction temperature does not fall below the melting points of the produced oligoamide and polyamide. Furthermore, the molecular weight of the polyamide resin can also be increased by further subjecting the product obtained through melt polycondensation to solid phase polymerization as necessary.

The polyamide resin may be subjected to polycondensation in the presence of a phosphorus atom-containing compound. When the polyamide resin is subjected to polycondensation in the presence of a phosphorus atom-containing compound, the processing stability during melt molding is enhanced, and coloration is readily suppressed.

Preferred specific examples of the phosphorus atom-containing compound include, but are not particularly limited to, a hypophosphorous acid compound (also referred to as a phosphinic acid compound or a phosphonous acid compound) and a phosphorous acid compound (also referred to as a phosphonic acid compound). The phosphorus atom-containing compound may be an organic metal salt, and of these, alkali metal salts are preferable.

Specific examples of the hypophosphorous acid compound include hypophosphorous acid; metal salts of hypophosphorous acid, such as sodium hypophosphite, potassium hypophosphite, lithium hypophosphite, and calcium hypophosphite; hypophosphorous acid compounds, such as ethyl hypophosphite, dimethylphosphinic acid, phenylmethylphosphinic acid, phenylphosphonous acid, and ethyl phenylphosphonite; and metal salts of phenylphosphonous acid, such as sodium phenylphosphonite, potassium phenylphosphonite, and lithium phenylphosphonite.

Specific examples of the phosphorous acid compound include phosphorous acid and pyrophosphorous acid; metal salts of phosphorous acid, such as disodium hydrogen phosphite, sodium phosphite, potassium phosphite, and calcium phosphite; phosphorous acid compounds, such as triethyl phosphite, triphenyl phosphite, ethylphosphonic acid, phenylphosphonic acid, and diethyl phenylphosphonate; sodium ethylphosphonate; potassium ethylphosphonate; and metal salts of phenylphosphonic acid such as sodium phenylphosphonate, potassium phenylphosphonate, and lithium phenylphosphonate.

The phosphorus atom-containing compound may be one type of those described above, or two or more types may be used in combination. Among the above-described compounds, from the viewpoints of an effect of promoting the polymerization reaction of the polyamide resin and an effect of preventing the occurrence of coloration, metal salts of hypophosphorous acid, such as sodium hypophosphite, potassium hypophosphite, lithium hypophosphite, and calcium hypophosphite are preferred, and sodium hypophosphite is more preferred.

Furthermore, polycondensation of the polyamide resin is preferably performed in the presence of a phosphorus atom-containing compound and an alkali metal compound. In order to prevent coloration of the polyamide resin during polycondensation, a sufficient amount of the phosphorus atom-containing compound must be present, but if the usage amount of the phosphorus atom-containing compound is too high, the amidation reaction rate may be overly accelerated, which may lead to gelation of the polyamide resin. Therefore, from the viewpoint of adjusting the rate of the amidation reaction, an alkali metal compound preferably coexists with the phosphorus atom-containing compound.

The alkali metal compound is not particularly limited, and specific preferable examples include alkali metal hydroxides and alkali metal acetates. Examples of the alkali metal hydroxide include lithium hydroxide, sodium hydroxide, potassium hydroxide, rubidium hydroxide, and cesium hydroxide, and examples of the alkali metal acetate include lithium acetate, sodium acetate, potassium acetate, rubidium acetate, and cesium acetate.

When an alkali metal compound is used in polycondensation of the polyamide resin, from the viewpoint of suppressing the formation of a gel, preferably, the usage amount of the alkali metal compound is in a range in which a value obtained by dividing the number of moles of the alkali metal compound by the number of moles of the phosphorus atom-containing compound is preferably from 0.5 to 1, more preferably from 0.55 to 0.95, and even more preferably from 0.6 to 0.9.

From the viewpoint of improving the recyclability of the polyester resin, that is, from the viewpoint of suppressing yellowing of the recycled polyester resin, the amino group concentration of the polyamide resin (Y) in the present invention is preferably not greater than 50 µmol/g, more preferably not greater than 45 µmol/g, even more preferably not greater than 40 µmol/g, yet even more preferably not greater than 30 µmol/g, and particularly preferably not greater than 20 µmol/g.

The amino group concentration in the polyamide resin is determined by precisely weighing the polyamide resin, dissolving the polyamide resin in a phenol/ethanol (4/1 by volume) solution under stirring at 20 to 30° C. until the polyamide resin is completely dissolved, and then rinsing the inner wall of the container with 5 mL of methanol under stirring, and subjecting the resultant to neutralization titration with a 0.01 mol/L hydrochloric acid aqueous solution.

The method for adjusting the amino group concentration of the polyamide resin is not particularly limited, but the amino group concentration can be suppressed to a low level through, for example, a method in which the charged ratio (molar ratio) of the diamine and the dicarboxylic acid is adjusted, and a polycondensation reaction is carried out; a method in which a monocarboxylic acid capable of capping an amino group is charged together with the diamine and the dicarboxylic acid, and a polycondensation reaction is carried out; or a method in which the polycondensation reaction is carried out, after which the resultant is reacted with a carboxylic acid capable of capping an amino group.

(Transition Metal)

In the present invention, the polyamide layer may include a transition metal for the purpose of inducing an oxidation reaction of the polyamide resin (Y) to increase the oxygen absorption capacity and to further enhance gas barrier properties.

The transition metal is preferably at least one selected from the group consisting of transition metals belonging to the Group VIII of the periodic table of elements, manganese, copper, and zinc, and from the viewpoint of expressing an oxygen absorption capacity, the transition metal element is more preferably at least one selected from the group consisting of cobalt, iron, manganese, and nickel, and is even more preferably cobalt.

The transition metal may be used alone, or may be used in the form of a low-valence oxide, an inorganic acid salt, an organic acid salt, or a complex salt, each containing the aforementioned metal. Examples of the inorganic acid salt include halides such as chlorides or bromides, and carbonates, sulfates, nitrates, phosphates, and silicates. Meanwhile, examples of the organic acid salt include carboxylates, sulfonates, and phosphonates. Moreover, a transition metal complex with a β-diketones or a β-keto acid ester or the like can also be used.

In particular, in the present invention, from the viewpoint of favorably expressing an oxygen absorbing capacity, it is preferable to use at least one type selected from the group consisting of carboxylates, carbonates, acetylacetonate complexes, oxides, and halides, which contain a transition metal. It is more preferable to use at least one selected from the group consisting of octanoates, neodecanoates, naphthenates, stearates, acetates, carbonates, and acetylacetonate complexes, and use of cobalt carboxylates such as cobalt octanoate, cobalt naphthenate, cobalt acetate, and cobalt stearate is more preferable.

One type of the abovementioned transition metals may be used alone, or two or more types may be used in combination.

The present inventors discovered that while transition metals tend to increase the oxygen absorption capacity, they also tend to decrease the molecular weight of the polyamide resin (Y) after oxygen absorption. It is thought that this decrease in molecular weight results in a decrease in mechanical strength, such as a decrease in the tensile elastic modulus, for example. Therefore, from the viewpoint of maintaining mechanical strength, the multilayered container of the present invention is preferably substantially free of a transition metal.

The content of the transition metal in the polyamide layer is, per 100 parts by mass of the polyamide resin (Y), preferably 0.01 parts by mass or less, and more preferably 0.005 parts by mass or less, and even more preferably, the polyamide layer substantially does not contain a transition metal. Here, the matter of the polyamide layer substantially does not contain a transition metal means that the content of the transition metal is 0.001 parts by mass or less, and preferably 0.0001 parts by mass or less, per 100 mass parts of the polyamide resin (Y).

Note that, when a carboxylate or the like containing a transition metal is used, the content of the transition metal refers to the content of the transition metal itself in the compound containing the transition metal.

<Other Components>

The polyester layer and the polyamide layer may contain various additive components. Examples of the additive components include colorants, thermal stabilizers, photostabilizers, moisture-proof agents, waterproofing agents, lubricants, and spreading agents.

Furthermore, the polyester layer and the polyamide layer may each contain a resin component other than the polyester resin and the polyamide resin, within a range that does not depart from the object of the present invention. In the polyester layer, the polyester resin (X) is a main component, and specifically, the content of the polyester resin (X) is preferably from 80 to 100 mass %, and more preferably from 90 to 100 mass %, relative to the amount of resin in the entire layer.

The content of the polyamide resin (Y) in the polyamide layer is preferably from 50 to 100 mass %, more preferably from 70 to 100 mass %, even more preferably from 80 to 100 mass %, and yet even more preferably from 90 to 100 mass % relative to the amount of resin in the entire layer.

In addition, the polyester resin layer preferably contains a colorant, and preferably contains a blue or violet colorant from the perspective of functioning as a complementary color for yellowing. The content of the blue or violet colorant in the polyester layer is preferably from 0.1 to 100 ppm, more preferably from 0.5 to 50 ppm, and even more preferably from 1 to 30 ppm relative to the polyester resin.

<Multilayered Container>

The multilayered container of the present invention is preferably a hollow container, and when the multilayered container is a hollow container, the trunk section thereof has at least a multilayer laminated structure.

The multilayered container of the present invention has a polyester layer and a polyamide layer, and the polyester layer is the innermost layer, and the polyamide layer is an intermediate layer. The multilayered container of the present invention preferably includes at least a polyester layer as an innermost layer, and a polyamide layer provided so as to directly contact the polyester layer.

In addition to the polyester layer at the innermost layer, the multilayered container of the present invention preferably has a polyester layer on the outer side of the polyamide layer. That is, at least one polyester layer is provided on each of the inner side and the outer side of the polyamide layer. It is more preferable to have a polyester layer on the outer side of the polyamide layer so as to directly contact the polyamide layer. Note that the polyester layer on the outer side of the polyamide layer is not limited to a case of the outermost layer, and a plurality of layers may be further provided on the outer side of the polyester layer.

Among these, the multilayered container of the present invention is particularly preferably a trilayer structure including polyester layers as the innermost layer and the outermost layer, and a polyamide layer as the intermediate layer. In other words, the multilayered container is particularly preferably a trilayer structure in which the layers are arranged in the order of a polyester layer/polyamide layer/polyester layer from the innermost layer to the outermost layer. A trilayer structure is preferable because the distance from the polyamide layer to the outer surface increases, impact from the outside is absorbed, impact is less likely to transfer to the interface between the polyester layer and the polyamide layer, and delamination resistance is improved.

The multilayered container of the present invention may have another layer besides the polyester layer and the polyamide layer. Specific examples of the other layer include a resin layer or an adhesive layer interposed between the polyester layer and the polyamide layer to adhere these layers. However, from the viewpoints of improving molding processability and separation ease during recycling, a resin layer or adhesive layer is preferably not interposed between the polyester layer and the polyamide layer.

When the overall thickness of the multilayered container of the present invention is 100%, the polyamide layer is present from a position of 5 to 35% from the inner surface. Note that the above requirements need only be satisfied at least at any position of the trunk section of the multilayered container, but the above requirements are preferably satisfied in the central part of the trunk section (the central part of the multilayered container in the height direction).

Note that when the multilayered container has a plurality of polyamide layers, it is sufficient that at least one polyamide layer satisfies the above-mentioned requirements, but it is more preferable that the innermost polyamide layer satisfies the above-mentioned requirements, and it is even more preferable for the multilayered container to have only one polyamide layer, and for that polyamide layer to fulfill the requirements described above.

When the overall thickness of the multilayered container is 100%, the polyamide layer is present from a position of 5 to 35% from the inner surface. By setting the position of the polyamide layer to be within the range described above, a multilayered container excelling in delamination resistance, and also exhibiting excellent oxygen barrier properties can be obtained. Furthermore, when the polyamide layer is positioned within the range described above, even in a case where electron beam irradiation is performed from the interior of the multilayered container as described below, the electron beam reaches the polyamide layer, the electron beam that has reached the polyamide layer generates radicals, and thereby the oxygen barrier property is further enhanced. Furthermore, adhesiveness at the interface between the polyester layer and the polyamide layer is improved by the electron beam, and the peeling resistance (delamination resistance) is further improved.

From the perspective described above, the polyamide layer is preferably present from a position of not less than 5.5%, more preferably not less than 6%, and even more preferably not less than 6.5% from the inner surface when the overall thickness of the multilayered container is 100%. The polyamide layer is also preferably present from a position of not more than 30%, more preferably not greater than 25%, even more preferably not greater than 20%, yet even more preferably not greater than 15%, still even more preferably not greater than 13.5%, and even more preferably not greater than 10%.

For a case in which the multilayered container is a trilayer structure including a polyester layer as the innermost layer, a polyester layer as the outermost layer, and a polyamide layer as the intermediate layer, from the viewpoint of delamination resistance, when the overall thickness of the multilayered container is 100%, the polyamide layer is preferably present from a position of not less than 50%, more preferably not less than 65%, even more preferably not less than 70%, and yet even more preferably not less than 80%, from the outer surface. In addition, the polyamide layer is preferably present from a position of not greater than 94%, more preferably not greater than 92%, even more preferably not greater than 90%, and yet even more preferably not greater than 87%.

For a case in which the multilayered container is a trilayer structure including a polyester layer as the innermost layer, a polyester layer as the outermost layer, and a polyamide layer as the intermediate layer, from the perspective of delamination resistance, a ratio of the thickness of the polyester layer of the innermost layer to the thickness of the polyester layer of the outermost layer (innermost layer/outermost layer) is preferably from 2/98 to 41/59, more preferably from 3/97 to 38/62, even more preferably from 4/96 to 28/72, and yet even more preferably from 5/95 to 20/80.

In addition, when the overall thickness of the multilayered container of the present invention is 100%, the thickness of the polyamide layer is from 1 to 15%. When the thickness of the polyamide layer is within the range described above, sufficient oxygen barrier properties can be obtained, and such a configuration is economical. Furthermore, even when the multilayered container is irradiated with an electron beam from the inside of the container, the electron beam reaches the polyamide layer, and an effect of improving the peeling resistance can be expected not only at the inner interface with the polyamide layer but also at the outer interface.

From the viewpoints described above, the thickness of the polyamide layer is preferably 1.5% or greater, and more preferably 2% or greater, and also preferably 12.5% or less, and more preferably 10% or less, based on the overall thickness of the multilayered container of 100%.

Here, the position and thickness of the polyamide layer and the thickness of the polyester layer described above are measured by a method described in the examples.

Note that the polyamide layer need not be laminated to a bottom section or neck section of the multilayered container, and the polyamide layer is preferably present at the thickness and position described above at least at a portion of the trunk section, preferably at the center part of the trunk section, and more preferably at 50% or greater of the length of the trunk section.

The content of the polyamide resin relative to the total amount of the polyester layer and the polyamide layer is preferably from 0.5 to 12 mass %, more preferably from 1 to 10 mass %, even more preferably from 1.5 to 8 mass %, and yet even more preferably from 2 to 7 mass %.

When the multilayered container is a hollow container, the overall thickness of the multilayered container (total thickness at the trunk section of the hollow container (i.e. total thickness of all layers of the trunk section)) is preferably within a range of from 50 to 500 µm, more preferably from 100 to 450 µm, and even more preferably from 200 to 400 µm.

Also, when the multilayered container is a hollow container, the position of the polyamide layer from the inner surface of the container (the position of the interface between the polyester layer of the innermost layer and the polyamide layer) is preferably from 5 to 300 µm, more preferably from 10 to 150 µm, even more preferably from 15 to 100 µm, yet even more preferably from 15 to 50 µm, and still even more preferably from 20 to 30 µm. By setting the position of the polyamide layer to be within the range described above, in particular, when electron beam irradiation is performed from within the multilayered container, the electron beams reach the polyamide layer, and electron beams that have reached the polyamide layer generate radicals, and thereby the radical concentration of the polyamide layer is increased, and the oxygen barrier properties are improved. Furthermore, adhesiveness at the interface between the polyester layer and the polyamide layer is improved by the electron beams, and the delamination resistance is further enhanced.

The volume of the multilayered container is not particularly limited, but from the viewpoints of oxygen barrier property, delamination resistant, and manufacturing, the volume thereof is preferably from 30 mL to 3000 mL, more preferably from 50 mL to 2000 mL, even more preferably from 100 mL to 1500 mL, yet even more preferably from 200 mL to 1000 mL, and still even more preferably from 250 mL to 600 mL.

The induction period until the expression of the oxygen absorption performance of the multilayered container including a polyester layer and a polyamide layer, and the expression period of oxygen absorption varies depending on the position of the polyamide layer and the volume of the multilayered container. From the viewpoint of balancing the delamination resistance and the oxygen absorption performance, normally the polyamide layer is preferably positioned from a lower portion of a support ring of a below-described preform to a position approximately 20 to 40 mm from the center of an injection gate of the preform. On the other hand, when oxygen absorption performance is emphasized, the polyamide layer is preferably positioned from an upper portion of the support ring to the vicinity of an injection gate, and the thickness of the polyamide layer is preferably increased.

The oxygen absorption performance also differs depending on the volume of the multilayered container. From the perspective of oxygen absorption performance, if the masses of the multilayered containers are the same, a multilayered container having a volume of from 280 to 350 mL is more preferable than a multilayered container having a volume of 500 mL.

(Electron Beam Irradiation and Radical Concentration)

The multilayered container of the present invention is preferably subjected to electron beam irradiation from the inside of the container, and the radical concentration of the polyamide layer is preferably not less than $1.0 \times 10^{-7}$ mol/g. Note that the multilayered container of the present invention may be a multilayered container that is obtained by subjecting a below-described preform to electron beam irradiation from the inside of the preform, and subsequently performing blow molding, or may be obtained by subjecting a blow-molded multilayered container molded body to electron beam irradiation from the inside. Among these, the multilayered container is preferably obtained by subjecting a blow-molded multilayered container molded body to electron beam irradiation from the inside.

Conventionally, electron beam irradiation has been performed for the purpose of sterilizing containers. Unlike sterilization through γ-rays or X-rays, a merit of electron beam sterilization is the short treatment time. With a container, only the inside of the container needs to be sterilized, and therefore in recent years, the inside of containers have been sterilized by irradiating only the inner surface of the containers with electron beams. When a container is irradiated with electron beams from the inside, the sterilization treatment can be implemented at a lower acceleration voltage compared to a case in which electron beam irradiation is performed from the exterior of the container, and thus irradiating with electron beams from the inside is advantageous even in terms of energy conservation.

Since the multilayered container of the present invention is provided with a polyamide layer in the vicinity of the inner surface, electron beams can reach as far as the polyamide layer even when the container is irradiated with electron beams from the inside.

The inventors discovered that the oxygen barrier performance of the multilayered container of the present invention is further improved when the multilayered container is subjected to electron beam irradiation from the inside of the container. Although the detailed reason is unclear, it is presumed that in the multilayered container of the present invention, because the polyamide layer is provided near the inner surface, the polyamide layer is subjected to electron beam irradiation, radicals are generated in the polyamide layer, and because the radicals have an oxygen absorption capacity, the polyamide layer exhibits an even higher oxygen barrier property.

The inventors also discovered that when the multilayered container of the present invention is subjected to electron beam irradiation from the inside of the container, the peeling resistance (delamination resistance) is further improved. Although the detailed reason is unclear, as described above, in the multilayered container of the present invention, the electron beams can reach the interface between the polyamide layer and the polyester layer, and radicals are generated in the polyester layer and the polyamide layer due to irradiation with electron beams, and it is presumed that through this, bonds are formed at the interface between the polyester layer and the polyamide layer through oxygen atoms, nitrogen atoms, or hydroxyl groups, and as a result, the adhesiveness between the polyamide layer and the polyester layer is improved, and thereby a multilayered container having excellent peeling resistance (delamination resistance) is obtained.

The irradiation conditions of the electron beam are described below.

From the viewpoints of improving oxygen barrier properties and delamination resistance, the radical concentration of the polyamide layer is preferably $1.0 \times 10^{-7}$ mol/g or greater, more preferably $3.0 \times 10^{-7}$ mol/g or greater, even more preferably $7.0 \times 10^{-7}$ mol/g or greater, yet even more preferably $10 \times 10^{-7}$ mol/g or greater, and still even more preferably $50 \times 10^{-7}$ mol/g or greater. In addition, the upper limit value is not particularly limited, but from the perspective of conserving the energy used for electron beam irradiation, the upper limit value is preferably $200 \times 10^{-7}$ mol/g or less, and more preferably $100 \times 10^{-7}$ mol/g or less. The radical concentration can be measured by the method described in the examples.

The multilayered container of the present invention is preferably a hollow container, more preferably a liquid packaging container used by filling the inside of the hollow container with a liquid, and is even more preferably a beverage packaging container. Examples of the liquid to be filled in the inside may include various products, including beverages, such as water, carbonated water, oxygen water, hydrogen water, milk, dairy products, juices, coffee, coffee beverages, carbonated soft drinks, teas, and alcoholic beverages; liquid seasonings, such as sauces, soy sauce, syrup, sweet sake, and dressings; chemicals, such as agrochemicals and insecticides; pharmaceutical products; and detergents. Particularly preferable examples are beverages or carbonated beverages which easily deteriorate in the presence of oxygen, including for example, beer, wine, coffee, coffee beverages, fruit juices, carbonated soft drinks, carbonated water, and teas.

Furthermore, the multilayered container of the present invention exhibits an excellent oxygen barrier property, and the oxygen barrier property (mL/bottle·day·0.21 atm) of the container is preferably not greater than 0.040, more preferably not greater than 0.035, and even more preferably not greater than 0.030. Note that the oxygen barrier property described above is based on the containers produced in the examples described below.

The oxygen barrier property of the container can be evaluated through an oxygen permeability test by the MOCON method in accordance with ASTM D3985. For the measurements, an OX-TRAN2/61, available from MOCON, Inc. is used, an obtained 500 mL bottle is filled with 100 mL of water, nitrogen at 1 atm is circulated inside the bottle at a rate of 20 mL/min under conditions including an oxygen partial pressure of 0.21 atm, a temperature of 23° C., and a bottle internal humidity of 100% RH, and an external humidity of 50% RH, and oxygen contained in the nitrogen after circulating inside the bottle is detected by a coulometric sensor, and thereby the oxygen permeability is measured.

[Method for Producing Multilayered Container]

An appropriate method for producing the multilayered container of the present invention is selected with consideration of the structure and the like of the molded article. Specifically, the multilayered container can be obtained by injecting a molten resin or resin composition into a mold from an injection molding machine to produce a preform, and then subjecting the preform to blow stretching (injection blow molding, injection stretch blow molding).

Alternatively, the multilayered container can be obtained by blowing, in a mold, a parison obtained by extruding a molten resin or resin composition into the mold from an extruder (direct blow molding).

The multilayered container of the present invention is preferably fabricated by injection blow molding.

The multilayered container of the present invention is preferably produced by subjecting a preform to biaxial stretch blow molding.

The multilayered container of the present invention may be cold parison molded or hot parison molded. Cold parison molding (two-stage molding) is a molding process in which an injection molded preform is cooled to room temperature and stored, and then reheated with another device and supplied to blow molding. Meanwhile, hot parison molding (one stage molding) is a method of blow molding a parison by preheating at the time of injection molding and adjusting the temperature prior to blowing without completely cooling the parison to room temperature. In hot parison molding, in many cases, an injection molding machine, a temperature control zone, and a blow molding machine are provided in the same molding machine unit, and preform injection molding and blow molding are performed.

A first embodiment of the method for producing a multilayered container of the present invention is an aspect of molding through cold parison molding.

The first embodiment of the production method is described below in accordance with FIG. 1. FIG. 1 is a conceptual schematic view illustrating each step of cold parison molding. Of course, the first embodiment is not limited to the configuration depicted in FIG. 1.

In FIG. 1, first, a preform 1 is heated ((1) of FIG. 1). Heating is performed using an infrared heater 2 or the like.

Next, the heated preform 1 is biaxially stretched and blow molded. Namely, the preform is placed in a mold 3 ((2) of FIG. 1) and blow molded while being stretched by a stretching rod 4 ((3) and (4) of FIG. 1).

Stretching is, for example, a method in which the surface of a preform is heated, after which the preform is stretched axially by a mechanical means such as pressing with a core rod insert, and next, the stretched preform is stretched and blow molded in a transverse direction by blowing with high pressure air of normally from 2 to 4 MPa.

Furthermore, in order to improve the heat resistance of the container, stretching may be combined with a blow molding method that increases the crystallinity or reduces residual strain. For example, a method (single blow molding) exists in which the surface of a multilayer preform is heated, after which the preform is blow molded inside a mold of a temperature equal to or higher than the glass transition point.

Furthermore, the blow molding method may also be a so-called double blow molding method that includes a primary blow molding step in which the preform is biaxially stretched and blow molded to larger than the final shape, a step in which the primary blow molded article is heated and thermally shrunk to mold a secondary intermediate molded article, and lastly, a secondary blow molding step in which this secondary intermediate molded article is blow molded into a final container shape.

After blow molding, the mold 3 is removed to obtain a multilayered container 5 ((5) in FIG. 1).

In cold parison molding, the parison temperature before blow molding is determined with consideration of the glass transition temperatures (Tg) of the thermoplastic polyester resin (X) constituting the polyester resin layer and the polyamide resin (Y) constituting the polyamide layer. The matter of before blow molding refers to, for example, immediately prior to being blown after passing through a preheating zone.

The parison temperature is preferably a temperature greater than the glass transition temperature ($Tg_{max}$) of the resin having the highest glass transition temperature among the thermoplastic polyester resin (X) and the polyamide resin (Y) constituting the multilayered container of the present invention, and a temperature range of ($Tg_{max}$+0.1°) C. to ($Tg_{max}$+50°) C. is more preferable.

Furthermore, a difference between the glass transition temperature ($Tg_{min}$) of the resin having the lowest glass transition temperature among the thermoplastic polyester resin (X) and the polyamide resin (Y), and the above-mentioned $Tg_{max}$ is preferably not larger than 40° C., and more preferably not larger than 30° C. When the difference is set to such a range, blow moldability tends to further improve.

Furthermore, when at least one of the thermoplastic polyester resin (X) or the polyamide resin (Y) is a crystalline resin, a difference between a lowest temperature ($Tc_{min}$) among the crystallization temperatures (Tc) of the crystalline resins, and the glass transition temperature ($Tg_{max}$) of the resin with the highest glass transition temperature from among the thermoplastic polyester resin (X) and the polyamide resin (Y) is preferably large.

Specifically, $Tc_{min}-Tg_{max}$ is preferably 5° C. or larger, and more preferably 10° C. or larger.

An upper limit of 100° C. for $Tc_{min}-Tg_{max}$ is practical. When the difference is set to such a range, blow moldability tends to further improve.

Note that when the polyester layer includes other components other than the thermoplastic polyester resin (X), a polyester resin mixture or polyester resin composition is preferably prepared by mixing the thermoplastic polyester resin (X) and other components in advance, prior to molding the preform. Note that the mixing may be performed by dry blending or melt blending (melt-kneading). That is, the polyester resin mixture may be prepared by dry blending the thermoplastic polyester resin (X) and other components, or the polyester resin composition may be prepared by melt blending the thermoplastic polyester resin (X) and other components. Of these methods, dry blending is preferable from the viewpoint of reducing the thermal history. Here, dry blending means mechanically mixing in a granular or pelletized form. Mixing may be performed using a mixing device such as a tumbler mixer, a ribbon mixer, a Henschel mixer, or a Banbury mixer. Alternatively, when supplying materials to the molding process, a predetermined amount of other components may be supplied by a feeder (or a liquid adding device) separate from a supply feeder for the thermoplastic polyester resin (X) to thereby form a polyester resin mixture immediately prior to molding the parison.

Furthermore, when melt-kneading the thermoplastic polyester resin (X) and other components, the temperature during melt kneading is not particularly limited, but from the viewpoint of sufficiently melting the thermoplastic polyester resin (X) and thoroughly kneading with the other components, the temperature is preferably from 300 to 255° C., more preferably from 290 to 260° C., and even more preferably from 285 to 265° C. Furthermore, the time for melt-kneading is not particularly limited, but from the viewpoint of uniformly mixing the thermoplastic polyester resin (X) and other components, the melt-kneading time is preferably from 10 to 600 seconds, more preferably from 20 to 400 seconds, and even more preferably from 30 to 300 seconds. The device used for melt-kneading is not particularly limited, but examples include an open type mixing roll, a non-open type Banbury mixer, a kneader, and a continuous kneader (such as a single-screw kneader, a twin screw kneader, and a multi-screw kneader).

In addition, when the polyamide layer includes other components in addition to the polyamide resin (Y), preferably, prior to molding the preform, a polyamide resin mixture or polyamide resin composition is prepared by mixing the polyamide resin (Y) and other components in advance. The mixing may be performed by dry blending or melt blending (melt-kneading). That is, a polyamide resin mixture may be prepared by dry blending the polyamide resin (Y) and other components, or a polyamide resin composition may be prepared by melt blending the polyamide resin (Y) and other components. Of these methods, dry blending is preferable from the viewpoint of reducing the thermal history. A mixing device similar to that used for the polyester resin mixture described above is used for mixing. Alternatively, when supplying materials to the molding process, a predetermined amount of other components may be supplied by a feeder (or a liquid adding device) separate from a supply feeder for the polyamide resin (Y) to thereby form a polyamide resin mixture immediately prior to molding the parison.

Furthermore, when melt-kneading the polyamide resin (Y) and other components, the temperature during melt kneading is not particularly limited, but from the viewpoint of sufficiently melting the polyamide resin (Y) and thoroughly kneading with the other components, the temperature is preferably from 300 to 245° C., more preferably from 290 to 250° C., and even more preferably from 280 to 255° C. In addition, the time for melt-kneading is not particularly limited, but from the viewpoint of uniformly mixing the polyamide resin (Y) and other components, the melt-kneading time is preferably from 10 to 600 seconds, more preferably from 20 to 400 seconds, and even more preferably from 30 to 300 seconds. The device used for melt-kneading is not particularly limited, but examples include an open type mixing roll, a non-open type Banbury mixer, a kneader, and a continuous kneader (such as a single-screw kneader, a twin screw kneader, and a multi-screw kneader).

The polyester resin (X) or polyester resin composition is then extruded from a first extruder, and the polyamide resin (Y) or polyamide resin composition is extruded from a second extruder to form a parison (multilayered preform). More specifically, a step of molding the multilayered preform through an extrusion molding method, a co-injection molding method, or a compression molding method is preferable.

In extrusion molding, the polyester resin or polyester resin composition, and the polyamide resin or polyamide resin composition are co-extrusion molded to form the multilayered preform.

Also, in co-injection molding, the polyester resin or polyester resin composition, and the polyamide resin or polyamide resin composition are extruded into a mold, respectively, and co-injection molded to form a multilayered preform.

An example of a method for compression molding is a method in which the polyamide resin or polyamide resin composition in a heated and molten state is intermittently extruded into an extrusion channel in which flows the polyester resin or polyester resin composition in a heated and molten state, and the polyester resin or polyester resin composition surrounding substantially the entire extruded polyamide resin or polyamide resin composition is extruded from an extrusion port of the extrusion channel and appropriately supplied as a molten resin molding material into a molding mold, and is subsequently compression molded to thereby mold a multilayered preform.

Of these methods, co-injection molding is preferable from the viewpoint of production efficiency.

The multilayered preform obtained in this manner is preferably configured in a trilayer structure including polyester layers as the innermost layer and the outermost layer, and a polyamide layer as an intermediate layer, and is more preferably a trilayer structure in which the polyester layer/polyamide layer/polyester layer are arranged in this order from the innermost layer to the outermost layer.

In the present invention, when the overall thickness is 100%, it is preferable to produce a multilayered preform such that the polyamide layer is present from a position of 5 to 35% from the inner surface, and the thickness of the polyamide layer is from 1 to 15% of the overall thickness. Specifically, by adjusting the injection amount from the injection cylinder unit described above, a multilayered container including a polyamide layer at a desired position and of a desired thickness is obtained.

The fabrication of a bottle in which the position of the barrier layer is changed in the thickness direction can be obtained by providing a valve stem mechanism that is capable of adjusting the amount of each molten resin that is injected into the mold, with each molten resin corresponding to each layer, such as the polyester inner layer, the polyamide layer, and the polyester outer layer. In addition, the position of the polyamide layer in the thickness direction can also be adjusted as desired by adjusting the entrance angle of the flow channel of each layer at the junction section between the polyester layer and the polyamide layer. Note that the method for adjusting the position of the polyamide layer in the thickness direction is not limited to the method described above.

When a multilayered container with a trilayer structure including a polyester layer as an innermost layer, a polyester layer as an outermost layer, and a polyamide layer as an intermediate layer is to be obtained through co-injection molding, the injection amount of the polyamide resin constituting the polyamide layer is, with respect to the injection amount of all of the resins, preferably not less than 1.5%, and more preferably not less than 2%, and also preferably not greater than 12.5%, and more preferably not greater than 10%.

When a multilayered container with a trilayer structure including a polyester layer as an innermost layer, a polyester layer as an outermost layer, and a polyamide layer as an intermediate layer is to be obtained through co-injection molding, the injection amount of the polyester resin constituting the innermost layer is, with respect to the injection amount of all of the resins, preferably not less than 5.5%, more preferably not less than 6%, and even more preferably not less than 6.5%. The injection amount of the polyester resin constituting the innermost layer is also preferably not greater than 30%, more preferably not greater than 25%, even more preferably not greater than 20%, yet even more preferably not greater than 15%, still even more preferably not greater than 13.5%, and even more preferably not greater than 10%.

When a multilayered container with a trilayer structure including a polyester layer as an innermost layer, a polyester layer as an outermost layer, and a polyamide layer as an intermediate layer is to be obtained through co-injection molding, the mass ratio of the injection amount of the polyester resin constituting the innermost layer to the injection amount of the polyester resin constituting the outermost layer (innermost layer resin/outermost layer resin) is preferably from 2/98 to 41/59, more preferably from 3/97 to 38/62, even more preferably from 4/96 to 28/72, and yet even more preferably from 5/95 to 20/80.

The method for producing the multilayered container of the present invention is preferably a production method that comprises the following steps 1 and 2 in this order.

Step 1: producing a multilayered container molded body including a polyester layer as an innermost layer, and a polyamide layer as an intermediate layer.

Step 2: irradiating the multilayered container molded body with an electron beam from the inside.

That is, the multilayered container of the present invention is preferably a multilayered container obtained by molding a multilayered container molded body as described above, and then further irradiating the obtained multilayered container molded body with electron beams. The multilayered container of the present invention is also preferably irradiated with electron beams such that the radical concentration in the polyamide layer is $1.0 \times 10^{-7}$ mol/g or higher.

Irradiating the multilayered container molded body from the inside with electron beams enables a sterilization treatment at a lower acceleration voltage, and thus is advantageous even in terms of energy conservation.

From the viewpoints of sterilizing the inner surface of the multilayered container, allowing the electron beams to reach the polyamide layer, and improving oxygen absorption performance and peeling resistance (delamination resistance), the acceleration voltage of the electron beams irradiated in step 2 is preferably at least 1 keV, more preferably at least 5 keV, and even more preferably at least 10 keV. Furthermore, from the viewpoint of energy conservation, the acceleration voltage is preferably not greater than 200 keV, more preferably not greater than 150 keV, and even more preferably not greater than 130 keV.

In addition, from the viewpoints of sterilizing the inner surface of the multilayered container, allowing the electron beams to reach the polyamide layer, and improving oxygen absorption performance and peeling resistance (delamination resistance), the irradiation intensity (absorbed dose) of the electron beams irradiated in step 2 is preferably not less than 1 kGy, more preferably not less than 5 kGy, and even more preferably not less than 10 kGy, even more preferably not less than 20 kGy, and yet even more preferably not less than 40 kGy, and from the viewpoint of energy conservation, the irradiation intensity is preferably 100 kGy or less, more preferably 75 kGy or less, even more preferably 60 kGy or less, and yet even more preferably 50 kGy or less.

The method and device for irradiating the multilayered container with electron beams from the inside are not particularly limited, and for examples thereof, JP 2018-072076 A and JP 2013-129453 A can be referenced.

EXAMPLES

The present invention will be described more specifically hereinafter using examples and comparative examples, but the present invention is not limited to these examples.

The thermoplastic polyester resin (X) and the polyamide resin (Y-1) used in the examples and comparative examples are as follows.

<Thermoplastic Polyester Resin (X)>
PET (polyester resin): Polyethylene terephthalate (intrinsic viscosity: 0.83 dL/g), trade name: BK2180, available from Mitsubishi Chemical Corporation (melting point: 248° C.)

<Polyamide Resin (Y-1)>
MXD6 (polyamide resin): poly(meta-xylylene adipamide) (relative viscosity: 2.7, melting point: 240±5° C.), trade name: MX Nylon S6007, available from Mitsubishi Gas Chemical Co., Inc.

[Measurement and Evaluation Methods]
<Position and Thickness of Polyamide Layer>
The position and thickness of the polyamide layer in bottles fabricated in the Examples and Comparative Examples were measured as follows.

At a position 70 mm from the bottom section of the bottle, a sample measuring 1.5 cm×1.5 cm was cut out with a cutter in four directions (0°, 90°, 180°, 270°) with respect to the horizontal direction of the bottle. The overall thickness (total thickness) was measured using a Quick Micro MDQ micrometer available from Mitutoyo Corporation, and a ratio of the thicknesses of each layer was measured using a film thickness gauge (DC-8200, available from Gunze Co., Ltd.) that uses light interference. The position and thickness of the polyamide layer were then calculated from the obtained overall thickness (total thickness) and the ratio of the thicknesses of each layer. Note that the thickness of the polyester layer can also be calculated from the overall thickness (total thickness) and the ratio of the thicknesses of each layer.

<Method of Identifying Each Layer>

Each layer was identified through the below-described IR measurements and $^1$H-NMR measurements.

(IR Measurements)

A sample of each layer was cut into a 2 cm×2 cm square and subjected to IR measurements using the following device.

Device: Spectrum 100, available from PerkinElmer Japan Co., Ltd.

($^1$H-NMR)

A sample of each layer was extracted and dissolved in a trifluoroacetic acid-d solvent to a concentration of 1 mg/mL, and then subjected to 1H-NMR.

Device: AVANCE III-500, Ascend™ 500, available from Bruker Corporation

<Radical Concentration of Polyamide Layer>

The radical concentration of the polyamide layer was determined as follows.

Only the polyamide layer was removed from the bottles fabricated in the Examples and Comparative Examples. The polyamide layer was cut out so that the sample mass was 15 mg, and was then used as a sample for measurements. Two types of standard samples with concentrations of $1.0 \times 10^{-5}$ mol/L and $1.0 \times 10^{-6}$ mol/mL were prepared by dissolving a standard substance (4-hydroxy-2,2,6,6-tetramethylpiperidine-1-oxyl free radical) in benzene, and the electron spin resonance (ESR) of the measurement samples and the standard samples was measured (equipment used: JES-FR30 Free Radical Monitor, available from JEOL Ltd.). The radical concentration of the polyamide layer was calculated from an intensity ratio of a radical peak of the standard substance and the radical peak of the sample. The measurement lower limit was set to $1.0 \times 10^{-11}$ mol/g.

<Oxygen Barrier Property of Container>

The oxygen barrier property of the container was evaluated by the following method.

An oxygen permeability test was implemented through the MOCON method in accordance with ASTM D3985. The OX-TRAN 2/61 available from MOCON Inc. was used for the measurements. A 500 mL bottle obtained in each of the Examples and Comparative Examples was filled with 100 mL of water under conditions including an oxygen partial pressure of 0.21 atm, a temperature of 23° C., a bottle internal humidity of 100% RH, and an external humidity of 50% RH, then nitrogen at 1 atm was circulated inside the bottle at a rate of 20 mL/min and oxygen contained in the nitrogen after circulating inside the bottle was detected using a coulometric sensor, and thereby the oxygen permeability was measured.

The oxygen barrier property was determined from values for the oxygen permeation amount after 3 days from the startup of the measurements.

The evaluation criteria were as follows.

S: 0.008 mL/(bottle·day·0.21 atm) or less

A: Greater than 0.008 mL/(bottle·day·0.21 atm) and less than or equal to 0.015 mL/(bottle·day·0.21 atm)

B: Greater than 0.015 mL/(bottle·day·0.21 atm) and less than or equal to 0.020 mL/(bottle·day·0.21 atm)

C: Greater than 0.020 mL/(bottle·day·0.21 atm) and less than or equal to 0.040 mL/(bottle·day·0.21 atm)

D: Greater than 0.040 mL/(bottle·day·0.21 atm)

<Oxygen Absorption Amount Test>

The trunk section of the multilayered bottle was cut out, the polyamide layer was peeled off, and 1 g of the polyamide layer was placed in an aluminum bag. Next, cotton soaked with 20 mL of water, and 200 mL of air were also inserted into the aluminum bag, and the bag was sealed so that air could not enter from the outside. After 2 months of storage at 23° C., the air in the aluminum bag was removed by a syringe, and the oxygen concentration was measured.

Note that this test was performed in Examples 5 to 8 and Comparative Examples 4 to 7, and the oxygen absorption amount of each multilayered bottle was evaluated.

<Side Impact Test>

Each obtained multilayered bottle was filled with 500 mL of carbonated water and stored in a 23° C., 50% RH environment for one week. A side impact tester (a device in which a 3 kg weight is attached to a tip end of a pendulum, and the pendulum is dropped from a position of 90° with respect to a bottle to subject the trunk section of the bottle to an impact) was then used to repeatedly impact the trunk section of the carbonated water-filled bottle after one week of storage. Bottles in which the polyester layer and the polyamide layer did not peel after testing were considered to be passing. When the number of tests until the polyester layer and the polyamide layer peeled and the bottle failed was less than 30, the bottle thereof was evaluated as C, those for which the number of tests thereof was from 30 to less than 35 were evaluated as B2, those for which the number of tests thereof was from 35 to less than 40 were evaluated as B 1, and those for which the number of tests thereof was 40 or greater were evaluated as A.

A larger number of tests until peeling of the polyester layer and the polyamide layer occurs indicates more superior delamination resistance.

Examples 1 to 8 and Comparative Examples 1 to 7

<Production of a Preform>

An injection molding machine having a valve system mechanism capable of adjusting the amount of each molten resin that is injected into the mold, and a multilayered hot runner mold were used to produce a preform having a trilayer structure of a polyester layer/polyamide layer/polyester layer under the conditions indicated below.

Specifically, in Example 1, in order for the starting position of the polyamide layer (barrier layer) to be 7% from the inner surface (inner side) when the overall thickness (total thickness) is 100%, the injection amount of the polyester resin serving as the polyester layer of the inner layer was adjusted to 7% of the total, the injection amount of the polyamide resin serving as the barrier layer (intermediate layer) was adjusted to 10% of the total amount, and the injection amount of the polyester resin serving as the polyester layer of the outer layer was adjusted to 83% of the total, and the resins thereof were injected to fill a cavity of the mold, and thereby a preform (25 g) having a trilayer structure of a polyester layer/polyamide layer/polyester layer was obtained. The shape of the preform included an overall length of 92 mm, an outer diameter of 22 mm, and a wall thickness of 3.9 mm.

In addition, in Examples 2 to 4 and Comparative Examples 1, 2 and 3, the injection amounts of the polyester resin and polyamide resin were adjusted such that desired values were obtained for the thickness of the polyamide layer and the starting position of the polyamide layer from the inner layer, and injection molding was performed.

Skin-side injection cylinder temperature: 285° C.

Core-side injection cylinder temperature: 265° C.

Resin flow channel temperature in mold: 290° C.

Mold cooling water temperature: 15° C.

Cycle time: 33 s

Proportion of polyamide resin constituting the intermediate layer in the preform: 5 mass %

<Production of Multilayered Bottle>

Bottles were molded using each of the preforms fabricated by the production method described above.

Specifically, petaloid-type bottles were obtained by biaxially stretching and blow molding the obtained preforms using a biaxial stretch blow molding device (model EFB1000ET, available from Frontier Inc.). The overall length of each bottle was 223 mm, the outer diameter was 65 mm, and the internal volume was 500 mL (surface area: 0.04 m$^2$, trunk section average thickness: 0.35 mm), and the bottom part was petaloid shaped. No dimples were provided in the trunk section. The biaxial stretch blow molding conditions were as indicated below. The proportion of the polyamide layer to the total mass of the obtained bottle was 5 mass %. Note that the vicinity of the neck section and the bottom section of the obtained multilayer bottle were formed only from a polyester layer.

Preform heating temperature: 110° C.
Primary blow pressure: 0.9 MPa
Secondary blow pressure: 2.5 MPa
Primary blow delay time: 0.30 sec
Primary blow time: 0.30 sec
Secondary blow time: 2.0 sec
Blow exhaust time: 0.6 sec
Mold temperature: 30° C.

<Electron Beam Irradiation>

In Examples 5 to 8 and Comparative Examples 4 to 7, multilayered bottles were produced as described above, and the obtained multilayered bottles were irradiated with electron beams from the inside.

The acceleration voltage of the irradiated electron beams was 100 keV, and irradiation was performed so as to achieve the absorbed dose shown in Table 2.

The obtained multilayered bottles were subjected to the above-described measurements and evaluations.

TABLE 1

|  | Examples | | | | Comparative Examples | | |
| --- | --- | --- | --- | --- | --- | --- | --- |
|  | 1 | 2 | 3 | 4 | 1 | 2 | 3 |
| Inner and outer layers | PET | PET | PET | PET | PET | PET | PET |
| Intermediate layer | MXD6 | MXD6 | MXD6 | MXD6 | MXD6 | MXD6 | MXD6 |
| Starting position of polyamide layer (thickness from inner surface, %) | 7 | 13 | 23 | 34 | 43 | 52 | 3 |
| Presence/absence of electron beam irradiation | No | No | No | No | No | No | No |
| Oxygen barrier property test (mL/bottle · day · 0.21 atm) | A | A | A | A | B | B | *1 |
| Side impact test | A | B1 | B1 | B2 | C | C |  |

*1: Locations in which the intermediate layer was exposed at the inner layer surface were present, and because of this molding defect, subsequent evaluations were not performed.

TABLE 2

|  | Examples | | | | Comparative Examples | | | |
| --- | --- | --- | --- | --- | --- | --- | --- | --- |
|  | 5 | 6 | 7 | 8 | 4 | 5 | 6 | 7 |
| Inner and outer layers | PET | PET | PET | PET | PET | PET | PET | PET |
| Intermediate layer | MXD6 | MXD6 | MXD6 | MXD6 | MXD6 | MXD6 | MXD6 | MXD6 |
| Starting position of polyamide layer (thickness from inner surface, %) | 13 | 13 | 13 | 24 | 43 | 43 | 52 | 52 |
| Presence/absence of electron beam irradiation | Yes | Yes | Yes | Yes | Yes | Yes | Yes | Yes |
| Electron beam irradiation intensity (Absorbed Dose: kGy) | 10 | 30 | 50 | 30 | 10 | 30 | 10 | 30 |
| Radical concentration of polyamide layer ($\times 10^{-7}$ mol/g) *1 | 3.3 | 8.3 | 72 | — | Measurement lower limit or less | Measurement lower limit or less | — | — |
| Oxygen barrier property test (mL/bottle · day · 0.21 atm) | S | S | S | A | B | B | B | B |
| Oxygen absorption amount test (mL/cm$^3$) | 5.6 | 7.3 | 9.9 | 4.6 | 0 | 0.3 | 0 | 0 |
| Side impact test | A | A | A | A | C | C | C | C |

In the multilayered containers shown in Tables 1 and 2, the thickness of the polyamide layer at the center of the trunk section was 10% of the overall thickness for all samples.

From the results of Tables 1 and 2, a multilayered container with a high oxygen barrier property and peeling resistance (delamination resistance) was obtained in each of Examples 1 to 8, which satisfy the requirements of the present invention. Furthermore, in Example 5 to 8, which were irradiated with electron beams, multilayered containers with particularly excellent oxygen barrier properties and peeling resistance (delamination resistance) were obtained.

Note that the matter of the polyamide layer having oxygen absorption performance is specifically demonstrated through irradiation with electron beams, and in Examples 5 to 8, it is thought that oxygen absorption performance is imparted through irradiation with electron beams, thereby improving the oxygen barrier property.

In each of Examples 5, 6 and 7, as described above, only the polyamide layer was cut out to obtain a 15 mg sample, and the obtained samples were subjected to electron spin resonance (ESR) measurements. The results indicated that the radical concentrations in the polyamide layers of each of Examples 5, 6 and 7 were $3.3\times10^{-7}$ mol/g, $8.3\times10^{-7}$ mol/g, and $7.2\times10^{-7}$ mol/g, respectively, thereby demonstrating that radicals are generated in the polyamide layer through electron beam irradiation.

On the other hand, in Comparative Example 3 in which the polyamide layer was present from a position of 3% from the inner surface, which is a position of less than 5% from the inner surface, locations existed at which the polyamide layer, which is the intermediate layer, was exposed at the inner surface, resulting in poor molding. In addition, in Comparative Examples 1, 2 and 4 to 7 in which the polyamide layer was present from a position greater than 35% from the inner surface, in each case, the oxygen barrier performance was insufficient, and the effect of improving the oxygen barrier property and peeling resistance (delamination resistance) through electron beam irradiation was not observed. This is thought to be because the electron beam did not sufficiently reach the polyamide layer due to the polyamide layer being located at a position that is physically far from the inner surface. Furthermore, in Comparative Examples 4 and 5, ESR measurements were performed in the same manner as in Examples 5, 6 and 7, and the results indicate that radicals were not detected. These results are shown in Table 2.

Note that with the current electron beam irradiation conditions, it is thought that the electron beam reaches a depth of approximately 100 μm from the interior surface of the bottle. Therefore, in Examples 5 to 7, it is thought that the electron beam reached the interface between the polyamide layer and the polyester layer of the inner side, and the interface between the polyamide layer and the polyester layer of the outer side.

According to the present invention, a multilayered container excelling in delamination resistance while improving the oxygen barrier property can be obtained.

The multilayered container of the present invention can be suitably used as a container containing particularly beverages or carbonated beverages which easily deteriorate in the presence of oxygen, including, for example, beer, wine, coffee, coffee beverages, fruit juice, carbonated soft drinks, carbonated water, and teas.

REFERENCE SIGNS LIST

1 Preform
2 Infrared heater
3 Mold
4 Stretching rod
5 Multilayered container

The invention claimed is:

1. A multilayered container comprising:
a polyester layer containing a thermoplastic polyester resin (X); and
a polyamide layer containing a polyamide resin (Y),
the polyester layer being an innermost layer, and the polyamide layer being an intermediate layer; wherein
the polyamide resin (Y) comprises a polyamide resin (Y-1) including a constituent unit derived from a diamine and a constituent unit derived from a dicarboxylic acid, at least 70 mol % of the constituent units derived from a diamine being a constituent unit derived from a xylylenediamine, and at least 70 mol % of the constituent units derived from a dicarboxylic acid being a constituent unit derived from an am-linear aliphatic dicarboxylic acid having from 4 to 20 carbons;
when an overall thickness is 100%, the polyamide layer is present from a position of 5 to 35% from an inner surface, and a thickness of the polyamide layer is from 1 to 15%;
the multilayered container is a trilayer structure comprising polyester layers as the innermost layer and an outermost layer, and the polyamide layer as the intermediate layer; and
a ratio of the thickness of the polyester layer of the innermost layer to the thickness of the polyester layer of the outermost layer (innermost layer/outermost layer) is from 7/83 to 34/56.

2. The multilayered container according to claim 1, wherein the overall thickness of the multilayered container is from 50 to 500 μm.

3. The multilayered container according to claim 1, wherein the thermoplastic polyester resin (X) comprises a thermoplastic polyester resin (X-1) including a constituent unit derived from a dicarboxylic acid and a constituent unit derived from a diol, at least 50 mol % of the constituent units derived from a dicarboxylic acid being a constituent unit derived from terephthalic acid, and at least 50 mol % of the constituent units derived from a diol being a constituent unit derived from ethylene glycol.

4. The multilayered container according to claim 3, wherein the thermo-plastic polyester resin (X-1) comprises a constituent unit derived from a dicarboxylic acid and a constituent unit derived from a diol, at least 90 mol % of the constituent units derived from a dicarboxylic acid is a constituent unit derived from terephthalic acid, and at least 90 mol % of the constituent units derived from a diol is a constituent unit derived from ethylene glycol.

5. The multilayered container according to claim 1, wherein the polyamide resin (Y-1) comprises a constituent unit derived from a diamine and a constituent unit derived from a dicarboxylic acid, at least 80 mol % of the constituent units derived from a diamine is a constituent unit derived from a xylylenediamine, and at least 80 mol % of the constituent units derived from a dicarboxylic acid is a constituent unit derived from adipic acid.

6. The multilayered container according to claim 1, wherein the polyamide layer does not substantially contain a transition metal.

7. The multilayered container according to claim 1, wherein the multilayered container is irradiated with an electron beam from inside the container.

8. The multilayered container according to claim 1, wherein a radical concentration of the polyamide layer is greater than or equal to $1.0\times10^{-7}$ mol/g.

9. The multilayered container according to claim 4, wherein the multilayered container is irradiated with an electron beam from inside the container.

10. The multilayered container according to claim 4, wherein a radical concentration of the polyamide layer is greater than or equal to $1.0\times10^{-7}$ mol/g.

11. The multilayered container according to claim 1, wherein the thickness of the polyester layer of the innermost layer is from 24.5 to 119 μm.

12. The multilayered container according to claim 1, wherein an oxygen permeability of the multilayered container is not greater than 0.015 mL/bottle·day·0.21 atm when a volume of the multilayered container is 500 mL.

13. The multilayered container according to claim 1, wherein the ratio of the thickness of the polyester layer of the innermost layer to the thickness of the polyester layer of the outermost layer (innermost layer/outermost layer) is from 7/83 to 23/67.

* * * * *